(12) United States Patent
Deits et al.

(10) Patent No.: US 12,194,629 B2
(45) Date of Patent: *Jan. 14, 2025

(54) ROBOT MOVEMENT AND ONLINE TRAJECTORY OPTIMIZATION

(71) Applicant: Boston Dynamics, Inc., Waltham, MA (US)

(72) Inventors: Robin Deits, Lexington, MA (US); Scott Kuindersma, Bedford, MA (US); Matthew P. Kelly, Carlisle, MA (US); Twan Koolen, Cambridge, MA (US); Yeuhi Abe, Cambridge, MA (US); Benjamin Stephens, Cambridge, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,361

(22) Filed: Oct. 25, 2023

(65) Prior Publication Data

US 2024/0051122 A1 Feb. 15, 2024

Related U.S. Application Data

(63) Continuation of application No. 17/358,628, filed on Jun. 25, 2021, now Pat. No. 11,833,680.

(51) Int. Cl.
*G05D 1/00* (2024.01)
*B25J 9/16* (2006.01)
(Continued)

(52) U.S. Cl.
CPC ............ *B25J 9/1602* (2013.01); *B25J 13/08* (2013.01); *B62D 57/02* (2013.01); *G05D 1/0212* (2013.01); *G05D 1/0246* (2013.01)

(58) Field of Classification Search
None
See application file for complete search history.

(56) References Cited

U.S. PATENT DOCUMENTS

| | | |
|---|---|---|
| 10,017,218 B1 | 7/2018 | Swilling et al. |
| 11,560,192 B2 | 1/2023 | Bai et al. |

(Continued)

FOREIGN PATENT DOCUMENTS

| | | |
|---|---|---|
| CN | 108621165 A | 10/2018 |
| CN | 112000088 A | 11/2020 |
| WO | 2021065196 A1 | 4/2021 |

OTHER PUBLICATIONS

Budhiraja et al., Dynamics consensus between centroidal and whole-body models for locomotion of legged robots. 2019 International Conference on Robotics and Automation (ICRA). Apr. 2019. 8 pages. doi: 10.1109/ICRA.2019.8793878.

(Continued)

*Primary Examiner* — Jaime Figueroa
*Assistant Examiner* — Arslan Azhar
(74) *Attorney, Agent, or Firm* — PIERCE ATWOOD LLP

(57) ABSTRACT

Systems and methods for determining movement of a robot about an environment are provided. A computing system of the robot (i) receives information including a navigation target for the robot and a kinematic state of the robot; (ii) determines, based on the information and a trajectory target for the robot, a retargeted trajectory for the robot; (iii) determines, based on the retargeted trajectory, a centroidal trajectory for the robot and a kinematic trajectory for the robot consistent with the centroidal trajectory; and (iv) determines, based on the centroidal trajectory and the kinematic trajectory, a set of vectors having a vector for each of one or more joints of the robot.

20 Claims, 15 Drawing Sheets

(51) Int. Cl.
 B25J 13/08 (2006.01)
 B62D 57/02 (2006.01)

(56) References Cited

U.S. PATENT DOCUMENTS

| | | |
|---|---|---|
| 2007/0016329 A1 | 1/2007 | Herr et al. |
| 2007/0084278 A1 | 4/2007 | Kawal et al. |
| 2011/0106309 A1 | 5/2011 | Lim et al. |
| 2012/0158182 A1 | 6/2012 | Lee et al. |
| 2012/0290131 A1 | 11/2012 | Khoukhi |
| 2012/0316684 A1 | 12/2012 | Lee et al. |
| 2014/0025201 A1 | 1/2014 | Ryu et al. |
| 2015/0051734 A1 | 2/2015 | Zheng et al. |
| 2016/0221187 A1 | 8/2016 | Bradski et al. |
| 2019/0143517 A1 | 5/2019 | Yang et al. |
| 2020/0086482 A1 | 3/2020 | Johnson et al. |
| 2020/0171657 A1 | 6/2020 | Baier et al. |
| 2021/0107150 A1 | 4/2021 | Whitman et al. |
| 2021/0197370 A1* | 7/2021 | Chen .................. B25J 9/162 |
| 2022/0089234 A1 | 3/2022 | Sprowitz et al. |
| 2023/0016514 A1* | 1/2023 | Zheng ................ G05D 1/0251 |
| 2023/0117928 A1 | 4/2023 | Bellicoso et al. |

OTHER PUBLICATIONS

Carpentier et al., A versatile and efficient pattern generator for generalized legged locomotion. 2016 IEEE International Conference on Robotics and Automation (ICRA). May 2016. 8 pages. doi:10.1109/ICRA.2016.7487538.

Dafarra et al., Whole-Body Walking Generation using Contact Parametrization: A Non-Linear Trajectory Optimization Approach. arXiv:2003.04633v1. Mar. 10, 2020. 7 pages.

Dai et al., Whole-body motion planning with centroidal dynamics and full kinematics. 2014 IEEE-RAS International Conference on Humanoid Robots. Nov. 2014. 8 pages. doi: 10.1109/HUMANOIDS. 2014.7041375.

Fallon et al., An Architecture for Online Affordance-based Perception and Whole-body Planning. Computer Science and Artificial Intelligence Laboratory Technical Report. Mar. 16, 2014. 31 pages.

Kelly, An introduction to trajectory optimization: How to do your own direct collocation. SIAM Review. 2017;59(4):849-904. 57 pages.

Kuindersma et al., Optimization-based locomotion planning, estimation, and control design for the atlas humanoid robot. Autonomous Robots. Mar. 2016;40(3):429-55. doi:10.1007/s10514-015-9479-3.

Orin et al., Centroidal dynamics of a humanoid robot. Autonomous Robots. Oct. 2013; 35(2):161-76. 17 pages. doi: 10.1007/s10514-013-9341-4.

Ponton et al., On time optimization of centroidal momentum dynamics. arXiv:1709.09265v3. Feb. 26, 2018. 7 pages.

Zordan et al., Control of rotational dynamics for ground and aerial behavior. IEEE Transactions on Visualization and Computer Graphics. Oct. 2014. 12 pages. doi: 10.1109/TVCG.2014.2330610.

Sleiman, et al., "A Unified MPC Framework for Whole-Body Dynamic Locomotion and Manipulation", IEEE Robotics and Automation Letters., Preprinted Version Feb. 2021, pp. 1-8.

International Search Report and Written Opinion of the International Searching Authority for International Application No. PCT/US2022/046526, dated Jan. 30, 2023.

Alonso-Mora, et al., "Multi-Robot Navigation in Formation via Sequential Convex Programming," 2015, IEEE/RSJ International Conference on Intelligent Robots and Systems (IROS), Congress Center Hamburg, Germany, Sep. 28, 2015, pp. 4634-4641.

Meuller, et al., "A Computationally Efficient Algorithm for State-to-State Quadrocopter Trajectory Generation and Feasibility Verification", 2013, IEEE/RSJ International Conference on Intelligent Robots and Systems (ROS), Nov. 3, 2013, pp. 3480-3486.

Schiller, et al., "Suboptimal Nonlinear Moving Horizon Estimation", Arxiv. Org, Cornell University Library, 201 Olin. Library Cornell Library, Ithaca, NY 14853, Aug. 31, 2021, pp. 1-16.

Wenger, et al., "A Global Analysis of Following Trajectories by Redundant Manipulators in the Presence of Obstacles", IEEE Comp. Soc. Press, US, vol. 3, Publication Date, May 2, 1993, pp. 901-906.

Hughes, Mark, "Don't Get Lost in Deep Space: Understanding Quaternions", Mar. 10, 2017, https://www.allaboutcircuits.com/technical-articles/dont-get-lost-in-deep-space-understanding-quaternions (Year: 2017).

Wagner, DJ, "More About Torque", https://www.rpi.edu/dept/phys/Dept2/APPhys1/torque/torque/node11.html (Year: 1999).

* cited by examiner

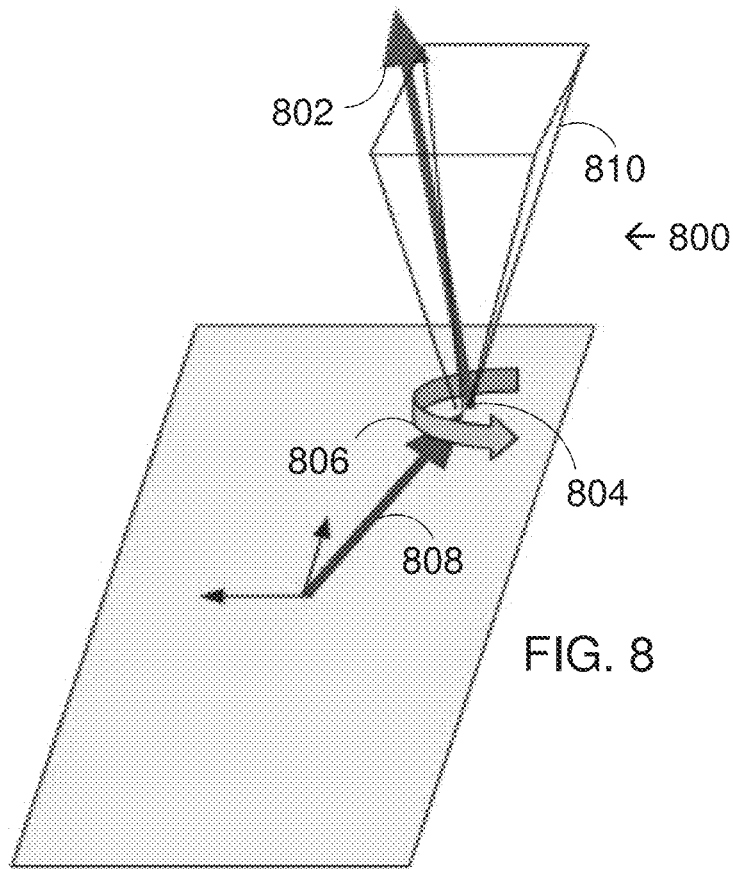

902 Receive, by a computing system of a robot, information including a navigation target for the robot and a kinematic state of the robot.

904 Determine, by the computing system, based on the information and a trajectory target for the robot, a retargeted trajectory the robot.

906 Determine, by the computing system, based on the retargeted trajectory, a centroidal trajectory for the robot and a kinematic trajectory for the robot consistent with the centroidal trajectory.

908 Determine, by the computing system, based on the centroidal trajectory and the kinematic trajectory, a set of motion vectors having a motion vector for each of one or more joints of the robot.

FIG. 9

ROBOT MOVEMENT AND ONLINE TRAJECTORY OPTIMIZATION

RELATED APPLICATION

This application is a continuation of U.S. patent application Ser. No. 17/358,628, filed Jun. 25, 2021, entitled "ROBOT MOVEMENT AND ONLINE TRAJECTORY OPTIMIZATION," the entire contents of which is incorporated by reference herein.

TECHNICAL FIELD

This disclosure relates generally to robotics and more specifically to systems, methods and apparatuses, including computer programs, for determining movements and/or optimized trajectories of robotic devices.

BACKGROUND

Robotic devices are being developed for a variety of purposes today, such as to advance foundational research and to assist with missions that may be risky or taxing for humans to perform. Over time, robots have been tasked with traversing increasingly complicated environments, which may include difficult terrain, unforeseen obstacles, and/or unexpected changes in external conditions. To navigate such environments, robots can benefit from improved core agility and dynamic whole-body control schemes that take the robot's real world state and surroundings into account while economizing on the robot's computational resources.

SUMMARY

Some embodiments relate to systems, methods and apparatuses, including computer programs, for determining movements and/or optimized trajectories of robotic devices. A robot can be provided with a library of trajectories that correspond to one or more "template behaviors", such as running, walking, jumping, hopping, or other movements. The trajectories can be pre-computed (e.g., while the robot is "offline") and stored in memory accessible to the robot. During operation (e.g., while the robot is "online"), the robot can select one or more "target trajectories" and combine them with other information received in real-time, such as information regarding the robot's kinematic state and/or information about the robot's environment (e.g., as perceived and/or processed by the robot). These inputs can be used to determine one or more "retargeted trajectories" that allow the robot to move about its environment.

In one illustrative example, a robot can be provided with a library of template behaviors corresponding to parkour moves. The robot can then be tasked with navigating an obstacle course using the parkour moves. Parkour provides an exemplary vehicle for testing, demonstrating and advancing the movement capabilities of humanoid robots, as it typically involves movements that (i) use high energy, (ii) require athletic mobility and whole-body coordination, (iii) are responsive to the environment (e.g., use real-time perception and/or require adaptation), and (iv) are characterized by variety. However, other template behaviors or libraries of behaviors are also possible.

The approach of starting with template behaviors and adapting them to account for information received during operation (e.g., as described according to the systems and methods herein) can provide significant computational advantages during operation. For example, template behaviors can be calculated offline in detail, e.g., using nonlinear trajectory optimizations that are solved for long time horizons and include densely sampled data. With detailed template behaviors in hand, making small adaptations in real time can be achieved using significantly less computationally intense corrections (e.g., the robot may use much more sparsely sampled problem data and/or compute a solution over a much shorter time horizon). In this way, multi-dimensional, full body retargeted trajectories can be authored fluidly on command using a series of computational shortcuts that suffice to achieve the robot's real-world objectives.

In some embodiments, the costs and/or constraint structures of particular template behaviors can be task-specific, further minimizing the need for significant online adjustments. For example, a "front flip" template behavior might include a full-state trajectory in which the robot starts at a first point, lands at a second point at a specified displacement from the first point, accumulates a $2\pi$ rotation in pitch over a flight phase, and/or takes off with a certain angular momentum. Then, in the online phase, substantially the same move can be executed in the real world, with small adjustments made to account for real-world deviations, e.g., in the robot's actual take-off momentum, ground height, and/or internal actuation forces. The robot can make such adjustments in real time, e.g., by iteratively linearizing and/or periodically re-computing trajectories based on a sensed or computed evolution of circumstances within the robot and/or the robot's environment. For example, if a robot is tasked with front flipping, but its joints sense that it does not take off with exactly the momentum planned, the robot can calculate a new time and place of expected landing and adjust its trajectory accordingly.

The robot can use a set of reusable computing modules for performing the above operations, e.g., one module for determining a retargeted trajectory for the robot, another module for determining a centroidal trajectory for the robot, and another module for determining a kinematic trajectory of the robot. In some embodiments, the robot can select suitable behaviors automatically based upon information received from a perception module (e.g., the perception module can provide and/or calculate touch-down targets based on identified planar regions) and/or a kinematic state estimation module. The module for determining the centroidal trajectory for the robot can compute, for example, force, momentum and/or inertia trajectories, taking into account variables such as linear and/or angular dynamics constraints, body orientation, and/or other constraints on the robot's center of mass. The module for determining the kinematic trajectory can then compute a whole-body motion that is consistent with the centroidal trajectory, taking into account variables such as geometric constraints and/or joint limits.

The systems and methods described herein can be extended beyond single behaviors to achieve a fluid sequence of two or more blended behaviors. For example, the robot can populate a queue of multiple behaviors, and its computing architecture can create smooth connections between behaviors, blending them to create fluid motions. For example, the landing stage of one jump can blend into the take-off stage of another jump (rather than, for example, executing both jumps in succession with a full stop in between, which may appear less natural and/or be less energy efficient). In some embodiments, the queue of behaviors can be populated automatically based on information sensed from the environment (e.g., moves can be planned, chosen, and/or strung together by a perception module of the robot or a separate module in electronic communication with the perception module). In some embodiments, the robot can keep choosing moves until an entire user-specified mission is performed, extending the autonomous capabilities of the robot and further increasing its real-world usefulness.

In one aspect, the invention features a computer-implemented method. The method includes receiving, by a computing system of a robot, information including a navigation target for the robot and a kinematic state of the robot. The method includes determining, by the computing system, based on the information and a trajectory target for the robot, a retargeted trajectory for the robot. The method includes determining, by the computing system, based on the retargeted trajectory, a centroidal trajectory for the robot and a kinematic trajectory for the robot consistent with the centroidal trajectory. The method includes determining, by the computing system, based on the centroidal trajectory and the kinematic trajectory, a set of vectors (e.g., motion vectors) having a vector for each of one or more joints of the robot.

In some embodiments, one or more of the vectors in the set of vectors is used to control movement of the robot. In some embodiments, the method includes providing, by the computing system, the set of vectors to a set of controllers (e.g., one or more robotic joint servo controllers) of the robot (e.g., to control movement of the robot). In some embodiments, the method includes moving (e.g., by the one or more robotic joint servo controllers) one or more joints and/or links of the robot. In some embodiments, each vector in the set of vectors includes a torque about each respective joint of the robot. In some embodiments, the trajectory target is received from a trajectory library of the computing system. In some embodiments, the trajectory target includes a desired robot pose as a function of time and/or a desired robot velocity as a function of time. In some embodiments, the trajectory target corresponds to at least one of the following robot behaviors: jumping, jogging, hopping, vaulting, walking, standing, dancing, or gesturing. In some embodiments, the trajectory target includes pushing, grasping, and/or manipulating an object and/or an aspect of the robot's environment. In some embodiments, the trajectory target includes a linear motion of the robot, an angular body motion of the robot, and/or at least one contact wrench of the robot.

In some embodiments, the retargeted trajectory includes an adjusted linear motion of the robot, an adjusted angular body motion of the robot, and at least one adjusted contact wrench of the robot. In some embodiments, the information further includes a second navigation target for the robot and a second kinematic state of the robot. In some embodiments, the method further includes determining, by the computing system, based on the information and a second trajectory target for the robot, a second retargeted trajectory for the robot. In some embodiments, the method further includes determining, by the computing system, based on the second retargeted trajectory, a second centroidal trajectory for the robot and a second kinematic trajectory for the robot consistent with the second centroidal trajectory. In some embodiments, the method further includes determining, by the computing system, based on the second centroidal trajectory and the second kinematic trajectory, a second set of vectors having one vector for each of one or more joints of the robot. In some embodiments, the method further includes concatenating, by the computing system, the centroidal trajectory with the second centroidal trajectory. In some embodiments, the method further includes concatenating, by the computing system, the kinematic trajectory with the second kinematic trajectory. In some embodiments, the method includes concatenating, by the computing system, one or more numerical metrics associated with one or more behaviors in a queue of behaviors for execution by the robot (e.g., as provided as templates, as determined by the robot in real-time, and/or provided by an operator).

In some embodiments, determining the set of vectors occurs online. In some embodiments, the navigation target is determined by a perception module of the robot. In some embodiments, the perception module receives measurements from at least one depth perceiving camera of the robot. In some embodiments, the perception module identifies, based on the measurements, at least one local planar region in the robot's environment. In some embodiments, the kinematic state is determined by a kinematic state estimation module of the robot. In some embodiments, the kinematic state of the robot is approximated based on sensed or measured information about the robot. In some embodiments, the kinematic trajectory is consistent with at least one environmental constraint or physical constraint of the robot. In some embodiments, the at least one environmental constraint or physical constraint of the robot includes at least one of (i) an expected or desired touchdown position of the robot, (ii) an expected or desired touchdown time of the robot, (iii) an angular pose constraint of the robot, and/or (iv) a reachability limit of the robot.

In some embodiments, the retargeted trajectory is determined for a time horizon of greater than one second. In some embodiments, the time horizon is (or is about) one second. In some embodiments, the time horizon is (or is about) 1.2 seconds. In some embodiments, the robot is a humanoid robot, a biped robot, a quadruped robot, and/or a mobile robot. In some embodiments, the computing system determines new optimized retargeted trajectories iteratively by solving centroidal and kinematic optimization equations sequentially over time. In some embodiments, determining the vector for the each of one or more joints of the robot includes determining, as a function of time, a magnitude, and/or a direction of a force to apply to each respective joint. In some embodiments, the centroidal trajectory is represented using quaternions. In some embodiments, using quaternions can help capture large rotations that can occur within a horizon of a model predictive controller (MPC) of the robot while avoiding singularities. In some embodiments, the vector for each of the one or more joints includes a torque applied about the respective joint. In some embodiments, each torque is based on information including, for each of one or more links of the robot, a force on the link, a displacement of a center of pressure of the link relative to a geometric center of a contact patch of the link, and/or a torque about the center of pressure of the link. In some embodiments, the force is represented as a three-dimensional force acting on the link. In some embodiments, the center of pressure is represented as a two-dimensional displacement relative to a center of a contact patch of the link. In some embodiments, the torque is represented as a one-dimensional torque in a direction perpendicular to a surface of the link. In some embodiments, a yaw coefficient of friction for the link is specifiable independently of a linear coefficient of friction.

In another aspect, the invention includes a system (e.g., a robot or a computing system of a robot) including data processing hardware and memory hardware in communication with the data processing hardware. The memory hardware stores instructions that when executed on the data processing hardware cause the data processing hardware to perform certain operations. In some embodiments, one operation includes receiving information including a navigation target for the robot and a kinematic state of the robot.

In some embodiments, one operation includes determining, based on the information and a trajectory target for the robot, a retargeted trajectory for the robot. In some embodiments, one operation includes determining, based on the retargeted trajectory, a centroidal trajectory for the robot and a kinematic trajectory for the robot consistent with the centroidal trajectory. In some embodiments, one operation includes determining, based on the centroidal trajectory and the kinematic trajectory, a set of vectors having a vector for each of one or more joints of the robot.

In some embodiments, one or more of the vectors in the set of vectors is used to control movement of the robot. In some embodiments, the system provides the set of vectors to a set of controllers (e.g., one or more robotic joint servo controllers) of the robot (e.g., to control movement of the robot). In some embodiments, the robot moves (e.g., by the one or more robotic joint servo controllers) one or more joints and/or links. In some embodiments, each vector in the set of vectors includes a torque about each respective joint of the robot. In some embodiments, the trajectory target is received from a trajectory library of the computing system. In some embodiments, the trajectory target includes a desired robot pose as a function of time and/or a desired robot velocity as a function of time. In some embodiments, the trajectory target corresponds to at least one of the following robot behaviors: jumping, jogging, hopping, vaulting, walking, standing, dancing, and/or gesturing. In some embodiments, the trajectory target includes pushing, grasping, and/or manipulating an object or an aspect of the robot's environment. In some embodiments, the trajectory target includes a linear motion of the robot, an angular body motion of the robot, and/or at least one contact wrench of the robot.

In some embodiments, the retargeted trajectory includes an adjusted linear motion of the robot, an adjusted angular body motion of the robot, and/or at least one adjusted contact wrench of the robot. In some embodiments, the information further includes a second navigation target for the robot and a second kinematic state of the robot. In some embodiments, the operations further include determining, based on the information and a second trajectory target for the robot, a second retargeted trajectory for the robot. In some embodiments, the operations further include determining, based on the second retargeted trajectory, a second centroidal trajectory for the robot and a second kinematic trajectory for the robot consistent with the second centroidal trajectory. In some embodiments, the operations further include determining, based on the second centroidal trajectory and the second kinematic trajectory, a second set of vectors having one vector for each of one or more joints of the robot. In some embodiments, the operations further include concatenating the centroidal trajectory with the second centroidal trajectory. In some embodiments, the operations further include concatenating the kinematic trajectory with the second kinematic trajectory. In some embodiments, the operations include concatenating one or more numerical metrics associated with one or more behaviors in a queue of behaviors for execution (e.g., as provided as templates, as determined by a robotic device in real-time, and/or as provided by an operator).

In some embodiments, determining the set of vectors occurs online. In some embodiments, the navigation target is determined by a perception module of the robot. In some embodiments, the perception module receives measurements from at least one depth perceiving camera of the robot. In some embodiments, the perception module identifies, based on the measurements, at least one local planar region in the robot's environment. In some embodiments, the kinematic state is determined by a kinematic state estimation module of the robot. In some embodiments, the kinematic state of the robot is approximated based on sensed and/or measured information about the robot. In some embodiments, the kinematic trajectory is consistent with at least one environmental constraint or physical constraint of the robot. In some embodiments, the at least one environmental constraint or physical constraint of the robot includes at least one of (i) an expected or desired touchdown position of the robot, (ii) an expected or desired touchdown time of the robot, (iii) an angular pose constraint of the robot, and/or (iv) a reachability limit of the robot.

In some embodiments, the retargeted trajectory is determined for a time horizon of greater than one second. In some embodiments, the time horizon is (or is about) one second. In some embodiments, the time horizon is (or is about) 1.2 seconds. In some embodiments, the robot is a humanoid robot, a biped robot, a quadruped robot, and/or a mobile robot. In some embodiments, the computing system determines new optimized retargeted trajectories iteratively by solving centroidal and kinematic optimization equations sequentially over time. In some embodiments, determining the vector for the each of one or more joints of the robot includes determining, as a function of time, a magnitude, and/or a direction of a force to apply to each respective joint. In some embodiments, the centroidal trajectory is represented using quaternions. In some embodiments, using quaternions can help capture large rotations that can occur within a time horizon of a MPC of the robot horizon while avoiding singularities. In some embodiments, the vector for each of the one or more joints includes a torque applied about the respective joint. In some embodiments, each torque is based on information including, for each of one or more links of the robot, a force on the link, a displacement of a center of pressure of the link relative to a geometric center of a contact patch of the link, and/or a torque about the center of pressure of the link. In some embodiments, the force is represented as a three-dimensional force acting on the link. In some embodiments, the center of pressure is represented as a two-dimensional displacement relative to a center of a contact patch of the link. In some embodiments, the torque is represented as a one-dimensional torque in a direction perpendicular to a surface of the link. In some embodiments, a yaw coefficient of friction for the link is specifiable independently of a linear coefficient of friction.

In another aspect, the invention features a computer-readable medium having instructions stored thereon that, when executed on data processing hardware, cause the data processing hardware to perform some or all of the above-described operations (e.g., receiving information including a navigation target for the robot and a kinematic state of the robot; determining, based on the information and a trajectory target for the robot, a retargeted trajectory for the robot; determining, based on the retargeted trajectory, a centroidal trajectory for the robot and a kinematic trajectory for the robot consistent with the centroidal trajectory; and/or determining, based on the centroidal trajectory and the kinematic trajectory, a set of vectors having a vector for each of one or more joints of the robot).

BRIEF DESCRIPTION OF DRAWINGS

The advantages of some embodiments, together with further advantages, may be better understood by referring to the following description taken in conjunction with the accompanying drawings. The drawings are not intended to be drawn to scale. In the drawings, each identical or nearly identical component that is illustrated in various figures may be represented by a like numeral. For purposes of clarity, not every component may be labeled in every drawing.

FIG. 8 is a schematic diagram of a center-of-pressure formulation for a model predictive controller of a robot, according to an illustrative embodiment of the invention.

FIG. 9 is a flowchart of an exemplary computer-implemented method, according to an illustrative embodiment of the invention.

DETAILED DESCRIPTION

Figure 1:
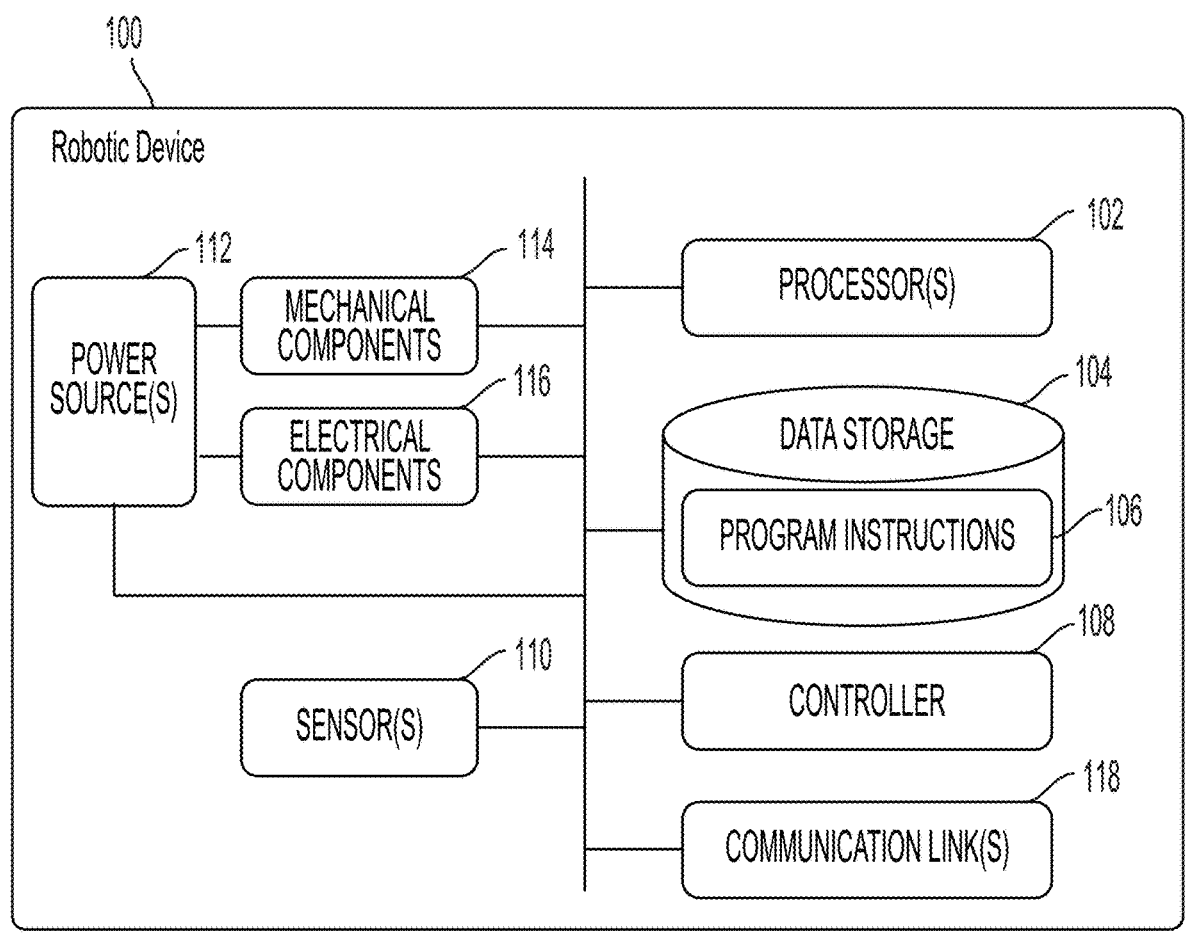
FIG. 1 illustrates an example configuration of a robotic device, according to an illustrative embodiment of the invention.

An example implementation involves a robotic device configured with at least one robotic limb, one or more sensors, and a processing system. The robotic limb may be an articulated robotic appendage including a number of members connected by joints. The robotic limb may also include a number of actuators (e.g., 2-5 actuators) coupled to the members of the limb that facilitate movement of the robotic limb through a range of motion limited by the joints connecting the members. The sensors may be configured to measure properties of the robotic device, such as angles of the joints, pressures within the actuators, joint torques, and/or positions, velocities, and/or accelerations of members of the robotic limb(s) at a given point in time. The sensors may also be configured to measure an orientation (e.g., a body orientation measurement) of the body of the robotic device (which may also be referred to herein as the "base" of the robotic device). Other example properties include the masses of various components of the robotic device, among other properties. The processing system of the robotic device may determine the angles of the joints of the robotic limb, either directly from angle sensor information or indirectly from other sensor information from which the joint angles can be calculated. The processing system may then estimate an orientation of the robotic device based on the sensed orientation of the base of the robotic device and the joint angles.

An orientation may herein refer to an angular position of an object. In some instances, an orientation may refer to an amount of rotation (e.g., in degrees or radians) about three axes. In some cases, an orientation of a robotic device may refer to the orientation of the robotic device with respect to a particular reference frame, such as the ground or a surface on which it stands. An orientation may describe the angular position using Euler angles, Tait-Bryan angles (also known as yaw, pitch, and roll angles), and/or Quaternions. In some instances, such as on a computer-readable medium, the orientation may be represented by an orientation matrix and/or an orientation quaternion, among other representations.

In some scenarios, measurements from sensors on the base of the robotic device may indicate that the robotic device is oriented in such a way and/or has a linear and/or angular velocity that requires control of one or more of the articulated appendages in order to maintain balance of the robotic device. In these scenarios, however, it may be the case that the limbs of the robotic device are oriented and/or moving such that balance control is not required. For example, the body of the robotic device may be tilted to the left, and sensors measuring the body's orientation may thus indicate a need to move limbs to balance the robotic device; however, one or more limbs of the robotic device may be extended to the right, causing the robotic device to be balanced despite the sensors on the base of the robotic device indicating otherwise. The limbs of a robotic device may apply a torque on the body of the robotic device and may also affect the robotic device's center of mass. Thus, orientation and angular velocity measurements of one portion of the robotic device may be an inaccurate representation of the orientation and angular velocity of the combination of the robotic device's body and limbs (which may be referred to herein as the "aggregate" orientation and angular velocity).

In some implementations, the processing system may be configured to estimate the aggregate orientation and/or angular velocity of the entire robotic device based on the sensed orientation of the base of the robotic device and the measured joint angles. The processing system has stored thereon a relationship between the joint angles of the robotic device and the extent to which the joint angles of the robotic device affect the orientation and/or angular velocity of the base of the robotic device. The relationship between the joint angles of the robotic device and the motion of the base of the robotic device may be determined based on the kinematics and mass properties of the limbs of the robotic devices. In other words, the relationship may specify the effects that the joint angles have on the aggregate orientation and/or angular velocity of the robotic device. Additionally, the processing system may be configured to determine components of the orientation and/or angular velocity of the robotic device caused by internal motion and components of the orientation and/or angular velocity of the robotic device caused by external motion. Further, the processing system may differentiate components of the aggregate orientation in order to determine the robotic device's aggregate yaw rate, pitch rate, and roll rate (which may be collectively referred to as the "aggregate angular velocity").

In some implementations, the robotic device may also include a control system that is configured to control the robotic device on the basis of a simplified model of the robotic device. The control system may be configured to receive the estimated aggregate orientation and/or angular velocity of the robotic device, and subsequently control one or more jointed limbs of the robotic device to behave in a certain manner (e.g., maintain the balance of the robotic device). For instance, the control system may determine locations at which to place the robotic device's feet and/or the force to exert by the robotic device's feet on a surface based on the aggregate orientation.

In some implementations, the robotic device may include force sensors that measure or estimate the external forces (e.g., the force applied by a leg of the robotic device against the ground) along with kinematic sensors to measure the orientation of the limbs of the robotic device. The processing system may be configured to determine the robotic device's angular momentum based on information measured by the sensors. The control system may be configured with a feedback-based state observer that receives the measured angular momentum and the aggregate angular velocity, and provides a reduced-noise estimate of the angular momentum of the robotic device. The state observer may also receive measurements and/or estimates of torques or forces acting on the robotic device and use them, among other information, as a basis to determine the reduced-noise estimate of the angular momentum of the robotic device.

The control system may be configured to actuate one or more actuators connected across components of a robotic leg. The actuators may be controlled to raise or lower the robotic leg. In some cases, a robotic leg may include actuators to control the robotic leg's motion in three dimensions. Depending on the particular implementation, the control system may be configured to use the aggregate orientation, along with other sensor measurements, as a basis to control the robot in a certain manner (e.g., stationary balancing, walking, running, galloping, etc.).

In some implementations, multiple relationships between the joint angles and their effect on the orientation and/or angular velocity of the base of the robotic device may be stored on the processing system. The processing system may select a particular relationship with which to determine the aggregate orientation and/or angular velocity based on the joint angles. For example, one relationship may be associated with a particular joint being between 0 and 90 degrees, and another relationship may be associated with the particular joint being between 91 and 180 degrees. The selected relationship may more accurately estimate the aggregate orientation of the robotic device than the other relationships.

In some implementations, the processing system may have stored thereon more than one relationship between the joint angles of the robotic device and the extent to which the joint angles of the robotic device affect the orientation and/or angular velocity of the base of the robotic device. Each relationship may correspond to one or more ranges of joint angle values (e.g., operating ranges). In some implementations, the robotic device may operate in one or more modes. A mode of operation may correspond to one or more of the joint angles being within a corresponding set of operating ranges. In these implementations, each mode of operation may correspond to a certain relationship.

The angular velocity of the robotic device may have multiple components describing the robotic device's orientation (e.g., rotational angles) along multiple planes. From the perspective of the robotic device, a rotational angle of the robotic device turned to the left or the right may be referred to herein as "yaw." A rotational angle of the robotic device upwards or downwards may be referred to herein as "pitch." A rotational angle of the robotic device tilted to the left or the right may be referred to herein as "roll." Additionally, the rate of change of the yaw, pitch, and roll may be referred to herein as the "yaw rate," the "pitch rate," and the "roll rate," respectively.

Referring now to the figures, FIG. 1 illustrates an example configuration of a robotic device (or "robot") 100, according to an illustrative embodiment of the invention. The robotic device 100 represents an example robotic device configured to perform the operations described herein. Additionally, the robotic device 100 may be configured to operate autonomously, semi-autonomously, and/or using directions provided by user(s), and may exist in various forms, such as a humanoid robot, biped, quadruped, or other mobile robot, among other examples. Furthermore, the robotic device 100 may also be referred to as a robotic system, mobile robot, or robot, among other designations.

As shown in FIG. 1, the robotic device 100 includes processor(s) 102, data storage 104, program instructions 106, controller 108, sensor(s) 110, power source(s) 112, mechanical components 114, and electrical components 116. The robotic device 100 is shown for illustration purposes and may include more or fewer components without departing from the scope of the disclosure herein. The various components of robotic device 100 may be connected in any manner, including via electronic communication means, e.g., wired or wireless connections. Further, in some examples, components of the robotic device 100 may be positioned on multiple distinct physical entities rather on a single physical entity. Other example illustrations of robotic device 100 may exist as well.

Processor(s) 102 may operate as one or more general-purpose processors or special purpose processors (e.g., digital signal processors, application specific integrated circuits, etc.). The processor(s) 102 can be configured to execute computer-readable program instructions 106 that are stored in the data storage 104 and are executable to provide the operations of the robotic device 100 described herein. For instance, the program instructions 106 may be executable to provide operations of controller 108, where the controller 108 may be configured to cause activation and/or deactivation of the mechanical components 114 and the electrical components 116. The processor(s) 102 may operate and enable the robotic device 100 to perform various functions, including the functions described herein.

The data storage 104 may include one or more various types of storage media, such as a memory. For example, the data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices, which may communicate electronically (e.g., via wired or wireless communication). Further, in addition to the computer-readable program instructions 106, the data storage 104 may include additional data such as diagnostic data, among other possibilities.

The robotic device 100 may include at least one controller 108, which may interface with the robotic device 100. The controller 108 may serve as a link between portions of the robotic device 100, such as a link between mechanical components 114 and/or electrical components 116. In some instances, the controller 108 may serve as an interface between the robotic device 100 and another computing device. Furthermore, the controller 108 may serve as an interface between the robotic system 100 and a user(s). The controller 108 may include various components for communicating with the robotic device 100, including one or more joysticks or buttons, among other features. The controller 108 may perform other operations for the robotic device 100 as well. Other examples of controllers may exist as well.

Additionally, the robotic device 100 includes one or more sensor(s) 110 such as force sensors, proximity sensors, motion sensors, load sensors, position sensors, touch sensors, depth sensors, ultrasonic range sensors, and/or infrared sensors, among other possibilities. The sensor(s) 110 may provide sensor data to the processor(s) 102 to allow for appropriate interaction of the robotic system 100 with the environment as well as monitoring of operation of the systems of the robotic device 100. The sensor data may be used in evaluation of various factors for activation and deactivation of mechanical components 114 and electrical components 116 by controller 108 and/or a computing system of the robotic device 100.

The sensor(s) 110 may provide information indicative of the environment of the robotic device for the controller 108 and/or computing system to use to determine operations for the robotic device 100. For example, the sensor(s) 110 may capture data corresponding to the terrain of the environment or location of nearby objects, which may assist with environment recognition and navigation, etc. In an example configuration, the robotic device 100 may include a sensor system that may include a camera, RADAR, LIDAR, time-of-flight camera, global positioning system (GPS) transceiver, and/or other sensors for capturing information of the environment of the robotic device 100. The sensor(s) 110 may monitor the environment in real-time and detect obstacles, elements of the terrain, weather conditions, temperature, and/or other parameters of the environment for the robotic device 100.

Further, the robotic device 100 may include other sensor(s) 110 configured to receive information indicative of the state of the robotic device 100, including sensor(s) 110 that may monitor the state of the various components of the robotic device 100. The sensor(s) 110 may measure activity of systems of the robotic device 100 and receive information based on the operation of the various features of the robotic device 100, such as the operation of extendable legs, arms, or other mechanical and/or electrical features of the robotic device 100. The sensor data provided by the sensors may enable the computing system of the robotic device 100 to determine errors in operation as well as monitor overall functioning of components of the robotic device 100.

For example, the computing system may use sensor data to determine the stability of the robotic device 100 during operations as well as measurements related to power levels, communication activities, components that require repair, among other information. As an example configuration, the robotic device 100 may include gyroscope(s), accelerometer(s), and/or other possible sensors to provide sensor data relating to the state of operation of the robotic device. Further, sensor(s) 110 may also monitor the current state of a function, such as a gait, that the robotic system 100 may currently be operating. Additionally, the sensor(s) 110 may measure a distance between a given robotic leg of a robotic device and a center of mass of the robotic device. Other example uses for the sensor(s) 110 may exist as well.

Additionally, the robotic device 100 may also include one or more power source(s) 112 configured to supply power to various components of the robotic device 100. Among possible power systems, the robotic device 100 may include a hydraulic system, electrical system, batteries, and/or other types of power systems. As an example illustration, the robotic device 100 may include one or more batteries configured to provide power to components via a wired and/or wireless connection. Within examples, components of the mechanical components 114 and electrical components 116 may each connect to a different power source or may be powered by the same power source. Components of the robotic system 100 may connect to multiple power sources as well.

Within example configurations, any type of power source may be used to power the robotic device 100, such as a gasoline and/or electric engine. Further, the power source(s) 112 may charge using various types of charging, such as wired connections to an outside power source, wireless charging, combustion, or other examples. Other configurations may also be possible. Additionally, the robotic device 100 may include a hydraulic system configured to provide power to the mechanical components 114 using fluid power. Components of the robotic device 100 may operate based on hydraulic fluid being transmitted throughout the hydraulic system to various hydraulic motors and hydraulic cylinders, for example. The hydraulic system of the robotic device 100 may transfer a large amount of power through small tubes, flexible hoses, or other links between components of the robotic device 100. Other power sources may be included within the robotic device 100.

Mechanical components 114 can represent hardware of the robotic system 100 that may enable the robotic device 100 to operate and perform physical functions. As a few examples, the robotic device 100 may include actuator(s), extendable leg(s) ("legs"), arm(s), wheel(s), one or multiple structured bodies for housing the computing system or other components, and/or other mechanical components. The mechanical components 114 may depend on the design of the robotic device 100 and may also be based on the functions and/or tasks the robotic device 100 may be configured to perform. As such, depending on the operation and functions of the robotic device 100, different mechanical components 114 may be available for the robotic device 100 to utilize. In some examples, the robotic device 100 may be configured to add and/or remove mechanical components 114, which may involve assistance from a user and/or other robotic device. For example, the robotic device 100 may be initially configured with four legs, but may be altered by a user or the robotic device 100 to remove two of the four legs to operate as a biped. Other examples of mechanical components 114 may be included.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic device 100. The electrical components 116 may interwork with the mechanical components 114 to enable the robotic device 100 to perform various operations. The electrical components 116 may be configured to provide power from the power source(s) 112 to the various mechanical components 114, for example. Further, the robotic device 100 may include electric motors. Other examples of electrical components 116 may exist as well.

In some implementations, the robotic device 100 may also include communication link(s) 118 configured to send and/or receive information. The communication link(s) 118 may transmit data indicating the state of the various components of the robotic device 100. For example, information read in by sensor(s) 110 may be transmitted via the communication link(s) 118 to a separate device. Other diagnostic information indicating the integrity or health of the power source(s) 112, mechanical components 114, electrical components 118, processor(s) 102, data storage 104, and/or controller 108 may be transmitted via the communication link(s) 118 to an external communication device.

In some implementations, the robotic device 100 may receive information at the communication link(s) 118 that is processed by the processor(s) 102. The received information may indicate data that is accessible by the processor(s) 102 during execution of the program instructions 106, for example. Further, the received information may change aspects of the controller 108 that may affect the behavior of the mechanical components 114 or the electrical components 116. In some cases, the received information indicates a query requesting a particular piece of information (e.g., the operational state of one or more of the components of the robotic device 100), and the processor(s) 102 may subsequently transmit that particular piece of information back out the communication link(s) 118.

In some cases, the communication link(s) 118 include a wired connection. The robotic device 100 may include one or more ports to interface the communication link(s) 118 to an external device. The communication link(s) 118 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, radio, Bluetooth, or a near-field communication (NFC) device.

Figure 2:
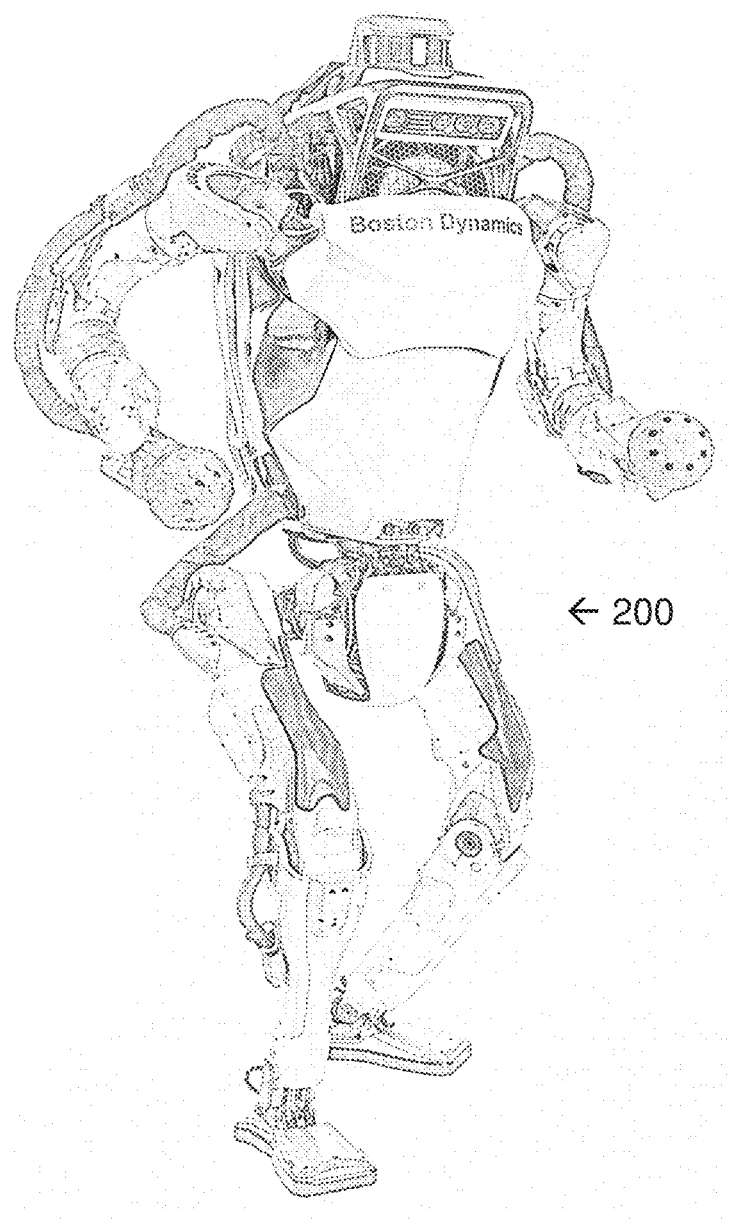
FIG. 2 illustrates an example of a humanoid robot, according to an illustrative embodiment of the invention.

FIG. 2 illustrates an example of a humanoid robot, according to an illustrative embodiment of the invention. The robotic device 200 may correspond to the robotic device 100 shown in FIG. 1. The robotic device 200 serves as a possible implementation of a robotic device that may be configured to include the systems and/or carry out the methods described herein. Other example implementations of robotic devices may exist.

The robotic device 200 may include a number of articulated appendages, such as robotic legs and/or robotic arms. Each articulated appendage may include a number of members connected by joints that allow the articulated appendage to move through certain degrees of freedom. Each member of an articulated appendage may have properties describing aspects of the member, such as its weight, weight distribution, length, and/or shape, among other properties. Similarly, each joint connecting the members of an articulated appendage may have known properties, such as the degrees of its range of motion the joint allows, the size of the joint, and the distance between members connected by the joint, among other properties. A given joint may be a joint allowing one degree of freedom (e.g., a knuckle joint or a hinge joint), a joint allowing two degrees of freedom (e.g., a cylindrical joint), a joint allowing three degrees of freedom (e.g., a ball and socket joint), or a joint allowing four or more degrees of freedom. A degree of freedom may refer to the ability of a member connected to a joint to move about a particular translational or rotational axis.

The robotic device 200 may also include sensors to measure the angles of the joints of its articulated appendages. In addition, the articulated appendages may include a number of actuators that can be controlled to extend and retract members of the articulated appendages. In some cases, the angle of a joint may be determined based on the extent of protrusion or retraction of a given actuator. In some instances, the joint angles may be inferred from position data of inertial measurement units (IMUS) mounted on the members of an articulated appendage. In some implementations, the joint angles may be measured using rotary position sensors, such as rotary encoders. In other implementations, the joint angles may be measured using optical reflection techniques. Other joint angle measurement techniques may also be used.

The robotic device 200 may be configured to send sensor data from the articulated appendages to a device coupled to the robotic device 200 such as a processing system, a computing system, or a control system. The robotic device 200 may include a memory, either included in a device on the robotic device 200 or as a standalone component, on which sensor data is stored. In some implementations, the sensor data is retained in the memory for a certain amount of time. In some cases, the stored sensor data may be processed or otherwise transformed for use by a control system on the robotic device 200. In some cases, the robotic device 200 may also transmit the sensor data over a wired or wireless connection (or other electronic communication means) to an external device.

Figure 3:
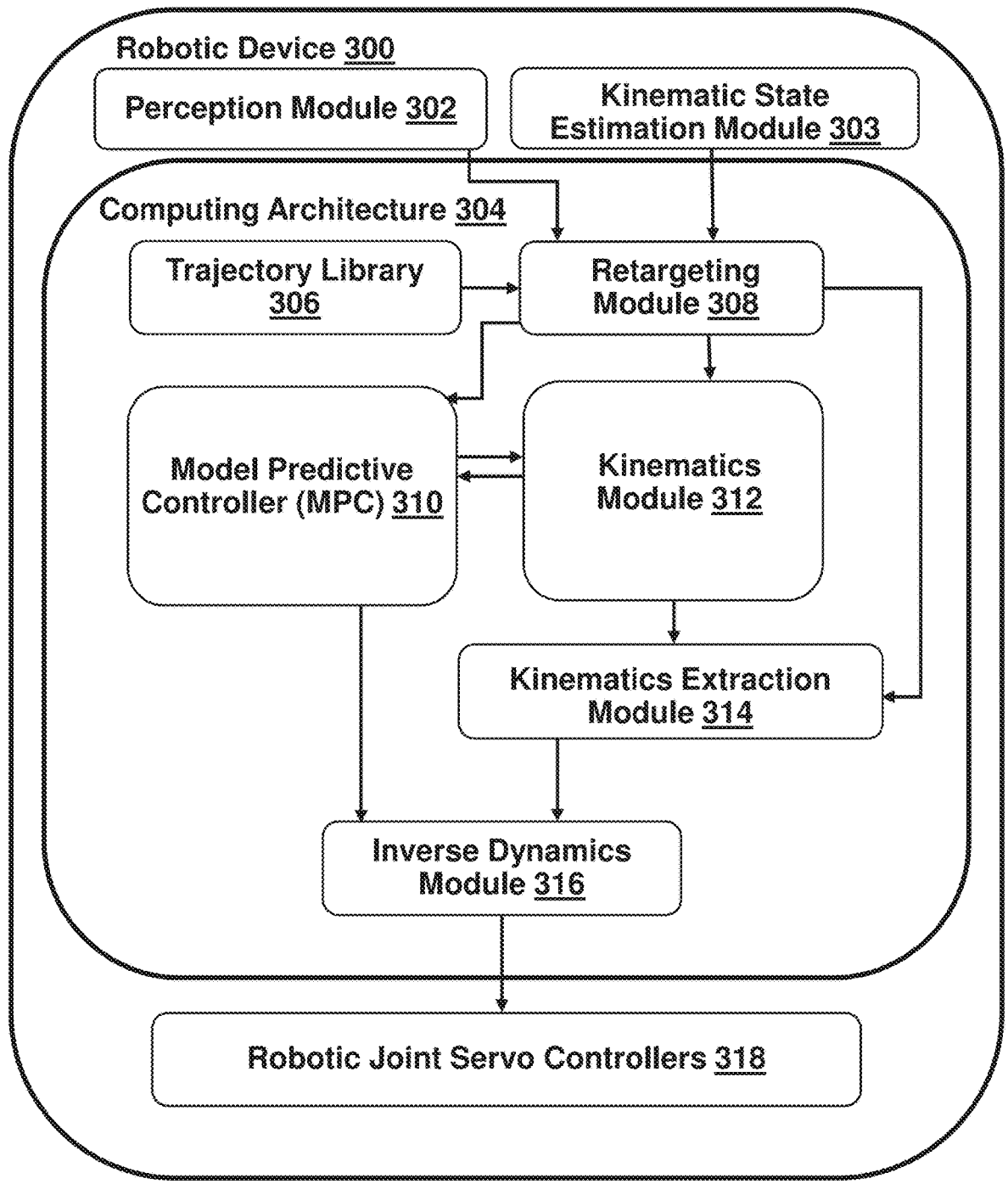
FIG. 3 illustrates an example computing architecture for a robotic device, according to an illustrative embodiment of the invention.

FIG. 3 illustrates an example computing architecture 304 for a robotic device 300, according to an illustrative embodiment of the invention. The computing architecture 304 includes a retargeting module 308, a model predictive controller (MPC) 310 (e.g., a centroidal MPC), and a kinematics module 312 (e.g., a kinematic touchdown solver). The computing architecture 304 can also include additional elements, such as a trajectory library 306, a kinematics extraction module 314, and/or an inverse dynamics module 316. In addition to the computing architecture 304, the robotic device 300 can include a perception module 302, a kinematic state estimation module 303, and/or one or more robotic joint servo controllers 318. Other configurations are also possible.

The perception module 302 can perceive one or more aspects of the environment of the robotic device 300 and/or provide input reflecting the environment to the computing architecture 304. For example, the perception module 302 can sense the environment using a depth camera, a LIDAR or stereo vision device, or another piece of equipment with suitable sensory capabilities. The perception module 302 can then extract local planar regions (e.g., using one or more plane fitting algorithms) to determine suitable surfaces to target for positioning the robotic device 300 and/or obstacles for the robotic device 300 to avoid. The perception module 302 can also use a planner (e.g., a heuristic planner) to determine touchdown locations for the robotic device 300 on the identified planar regions. In some embodiments, input provided by the perception module 302 can also be provided via other means (e.g., the environment can be programmed with a map).

The retargeting module 308 can receive output from the perception module 302 as a navigation target (e.g., as one or more touchdown locations for one or more feet of the robotic device 300). The retargeting module 308 can also receive a trajectory target (e.g., based on a template behavior) for the robotic device 300, from the trajectory library 306. In some embodiments, the trajectory target can be determined automatically (e.g., by or in coordination with the perception module 302) based upon the task to be achieved. In some embodiments, the trajectory target can be specified manually by an operator. In some embodiments, the trajectory target takes the form of a desired SE(3) pose for one or more robot links, such as foot locations at touchdown. The retargeting module 308 can also receive a kinematic state from the kinematic state estimation module 303. In some embodiments, the kinematic state takes the form of a vector including joint positions, velocities, and/or a position, orientation, and/or twist of the floating base. The kinematic state estimation module 303 can estimate the present kinematic state of the robotic device 300 (e.g., by combining measured position, velocity, acceleration, and/or force signals of the robotic device 300).

Based on the navigation target, the kinematic state, and the trajectory target, the retargeting module 308 can determine a retargeted trajectory for the robotic device 300. The retargeted trajectory can be similar to the target trajectory in format but can include one or more notable differences. For example, one or more numerical values may differ to account for perceived environmental obstacles, local environmental geometric constraints, unexpected variations in kinematic state, or other like variables. In such cases, the retargeted trajectory may represent a spatially warped version of the original trajectory target. In some embodiments, the retargeting module 308 outputs numerical information specifying joint positions, velocities, and/or accelerations as functions of time. In some embodiments, the numerical information takes the form of a cubic polynomial function for each robot joint, e.g., reflecting a position and a velocity for each joint as a function of time. In some embodiments, the retargeted trajectory includes information about the timing and/or location of contact events between one or more robot links and the environment.

The retargeted trajectory can be provided as input to the MPC 310 and the kinematics module 312, and can also be provided, in some embodiments, to the kinematics extraction module 314. Each of these modules can perform parallel and/or sequential (e.g., iterative) computations on the information reflected in the retargeted trajectory. For example, the MPC 310 can compute several different outputs for the robotic device 300 over a specified time horizon (e.g., a period of 1 second or 1.2 seconds), such as a trajectory for the position of its center of mass, a momentum of its center of mass, an angular momentum of its center of mass, an angular excursion, and a trajectory of contact wrenches applied at some subset of links of the robotic device 300.

In addition, the kinematics module 312 can calculate a single configuration or "whole-body pose" for the robotic device 300 that is consistent with the solution provided by the MPC 310 (e.g., in the form of a predicted set of parameters for the robot including a center of mass, an angular excursion, and one or more contact locations at touchdown) but also respects the robot's reachability limits and/or local geometric constraints, etc. In some embodiments, the MPC 310 can also provide information directly to the kinematics module 312, such as a location for the center of mass of the robotic device 300 and/or one or more touchdown locations for one or more feet of the robotic device 300. The kinematics module 312 can also provide information directly to the MPC 310, such as an inertia distribution for the robotic device 300, which the MPC 310 can factor into successive iterations of its future calculations.

In some embodiments, the kinematics extraction module 314 can receive input from the kinematics module 312 and output a single set of numerical components characterizing a configuration of the robotic device 300 to be achieved (e.g., a position, a velocity, and an acceleration for each of two feet with a planned touchdown as well as a center of mass of the robotic device 300). The inverse dynamics module 316 can take this information as input, together with a portion of the information provided by the MPC 310 (e.g., desired contact wrenches, which it can use to form objectives). The inverse dynamics module 316 can then output a reference joint position and/or torque for each of the robotic joint servo controllers 318, which can be provided to actuators of the robotic device 300 to enable the robotic device 300 to execute its planned movement.

In some embodiments, the inverse dynamics module 316 can track a desired wrench of the robotic device 300 as closely as possible or desired in a given situation. In some embodiments, the inverse dynamics module 316 can map a desired robot pose and/or one or more external wrenches to joint torques. In some embodiments, a subset of the control parameters of the robotic device 300 can function in a "position control" mode. In some embodiments, a subset of the control parameters of the robotic device can function in a "force control" mode. In some embodiments, certain components in the computing architecture 304 (e.g., the retargeting module 308, the MPC 310, the kinematics module 312, the kinematics extraction module 314, and the inverse dynamics module 316) can run at a refresh rate while the robot is in operation, e.g., in the range of 200-500 Hz, or about 300 Hz in one exemplary embodiment. In some embodiments, other components such as joint-level position and/or force servo controllers can run at a higher refresh rate, e.g., in the range of 750-4000 Hz, or about 3000 Hz in one exemplary embodiment.

In some embodiments, the robotic device 300 can practice "behavior sequencing" or "behavior blending", e.g., by populating a queue of behaviors using a planner. In some embodiments, the planner is part of the perception module 302 or is in communication with the perception module 302. The computing architecture 304 (e.g., the MPC 310 and/or the kinematics module 312) can then create smooth connections between behaviors, blending behaviors to create fluid motions. For example, the landing stage of one jump can blend into the take-off stage of another jump, rather than having the robot jump, come to a full stop, and then initiate another jump. In some embodiments, blending can arise as a byproduct of the cost structure of the MPC 310, which can promote smooth changes in momentum and/or force over time.

Figure 4A:
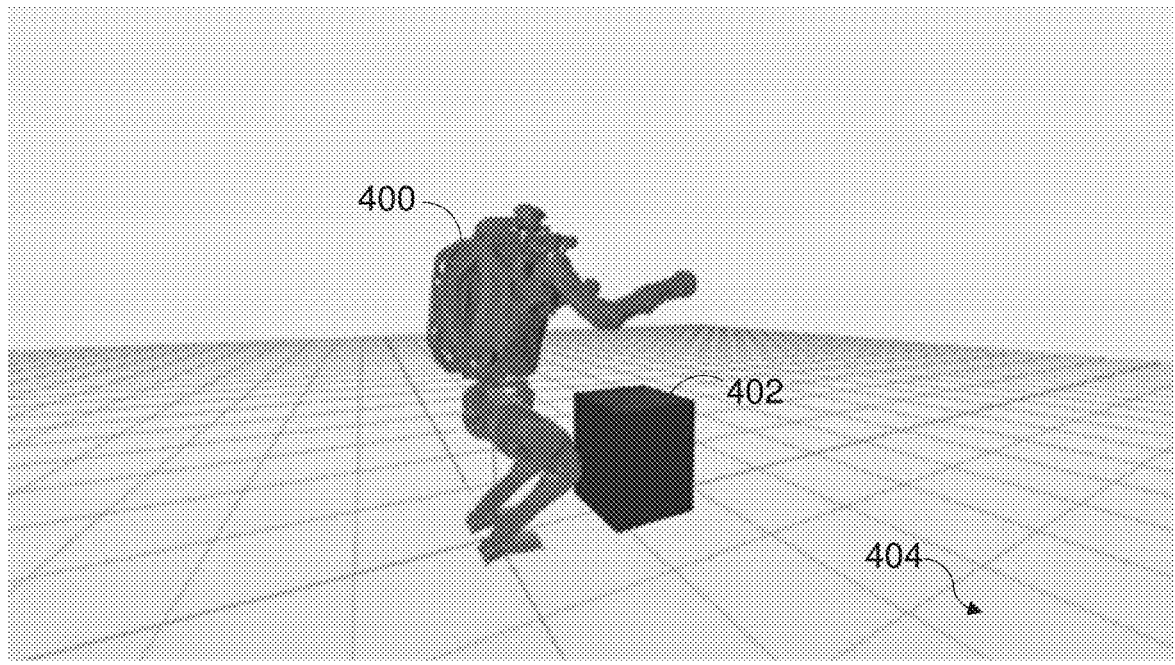
FIGS. 4A-4F are sequential schematic views of a model humanoid robot executing a target trajectory based on a template behavior of jumping up onto, and down off of, a rigid box, according to an illustrative embodiment of the invention.
Figure 4B:
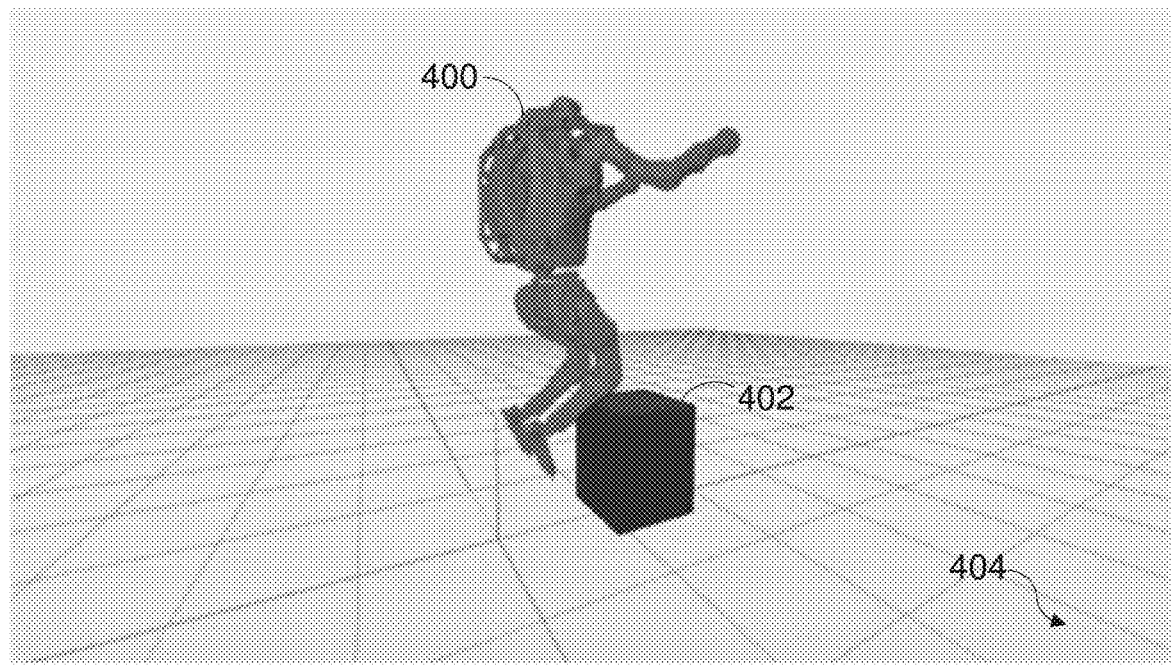
Figure 4C:
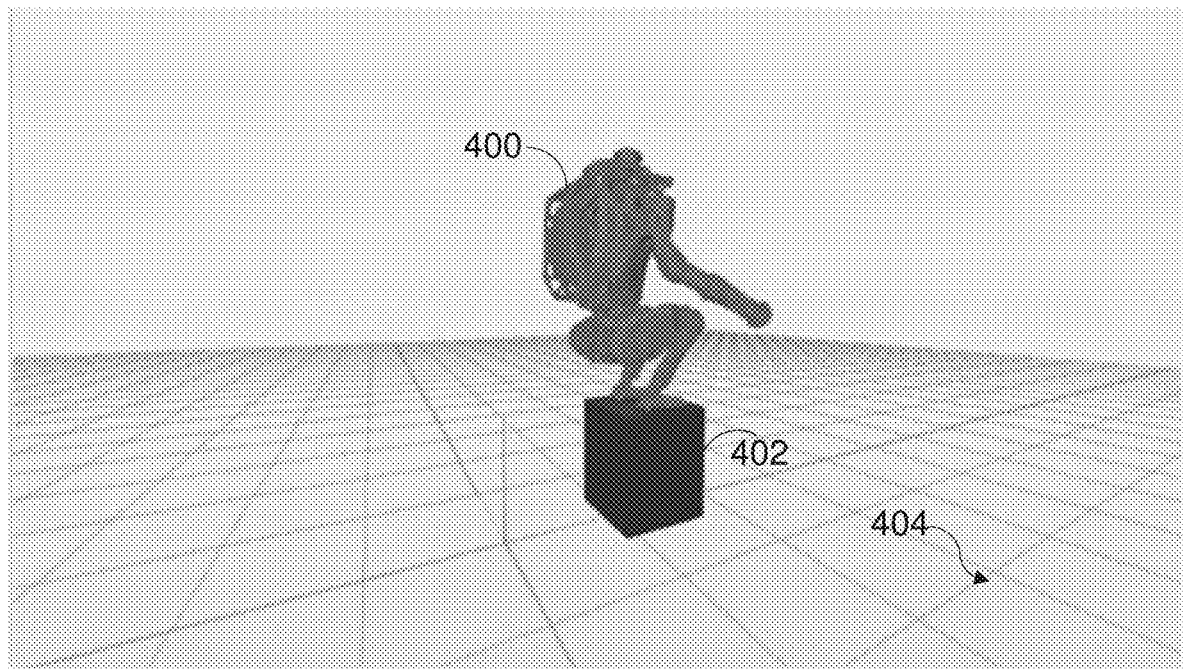
Figure 4D:
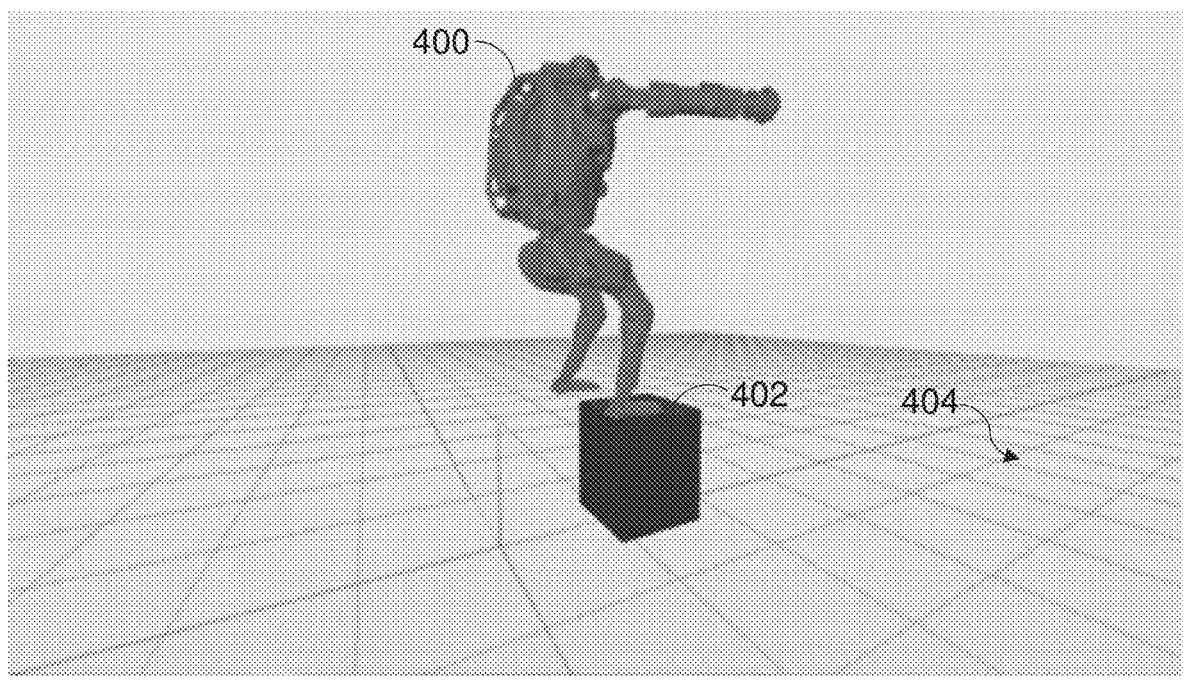
Figure 4E:
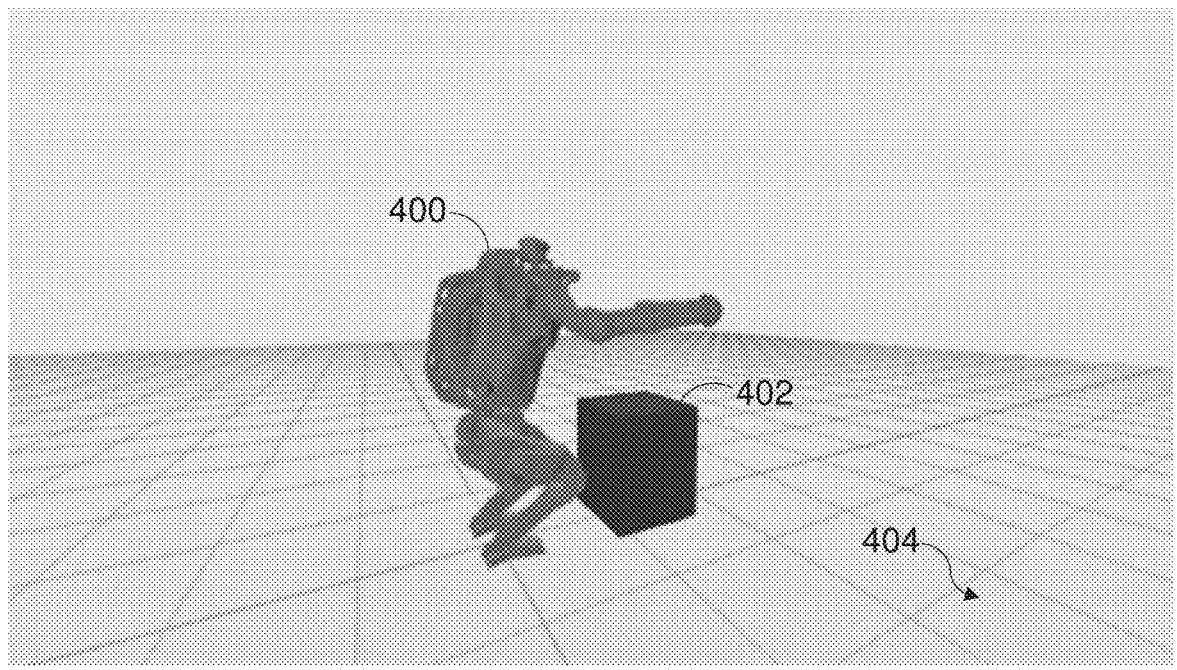
Figure 4F:
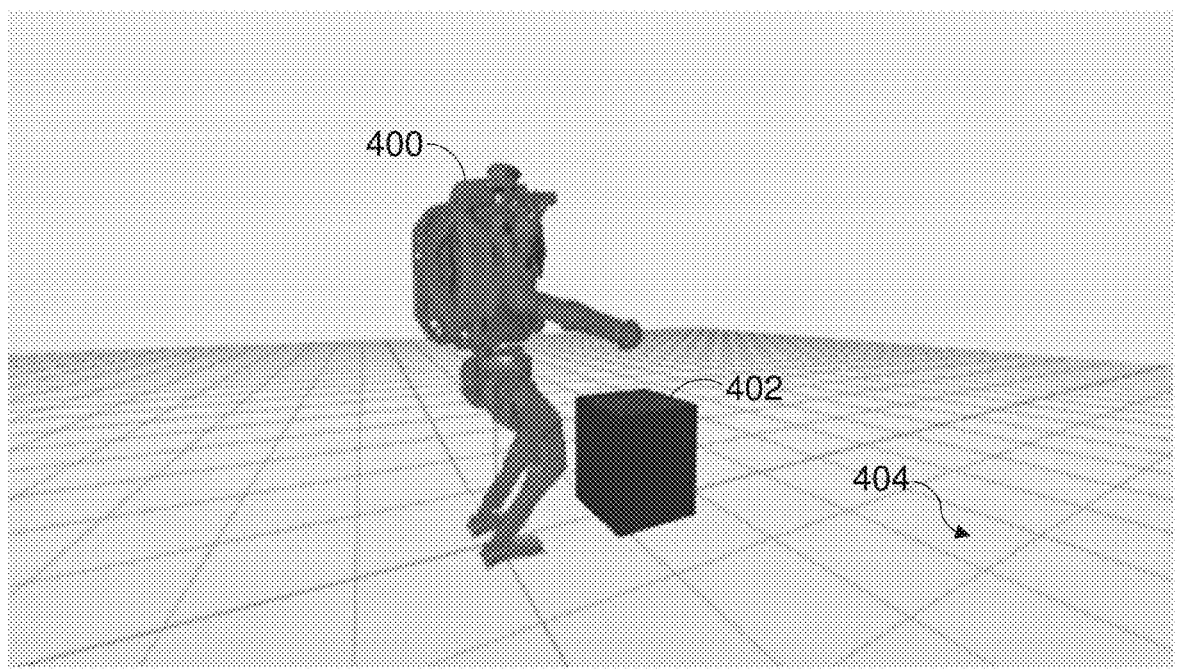
Figure 5A:
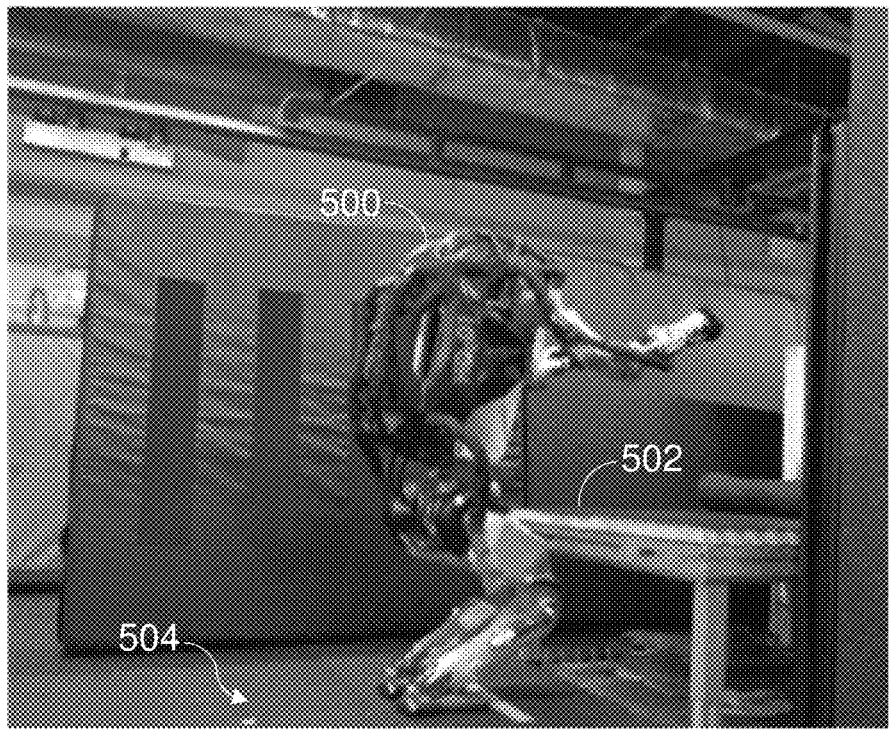
FIGS. 5A-5F are sequential views of a real-world humanoid robot executing a retargeted trajectory based on an adapted version of the target trajectory shown in FIGS. 4A-4F, according to an illustrative embodiment of the invention.
Figure 5B:
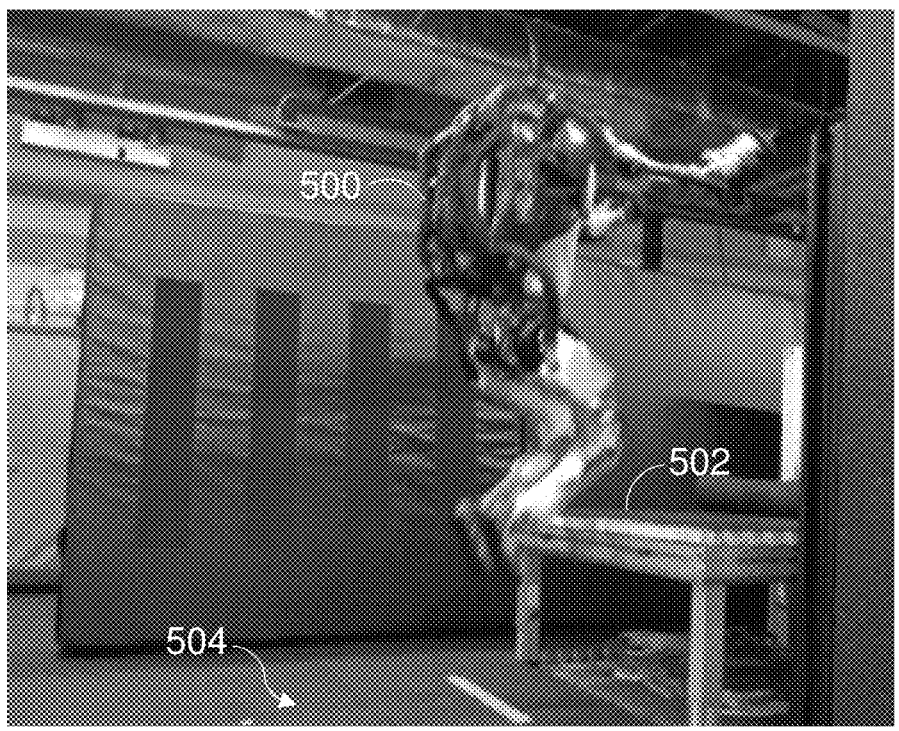
Figure 5C:
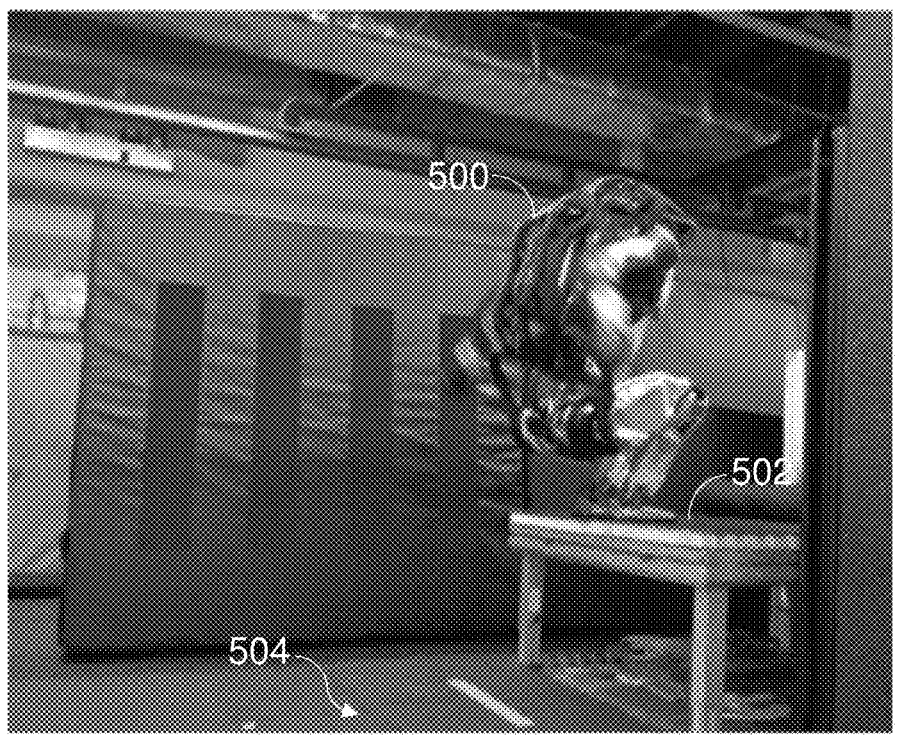
Figure 5D:
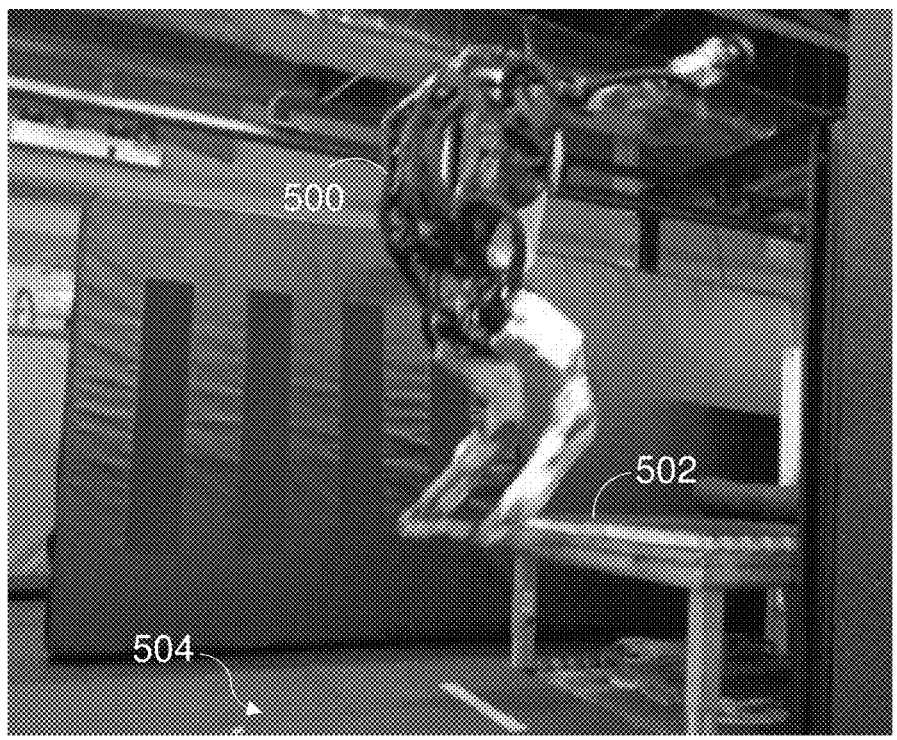
Figure 5E:
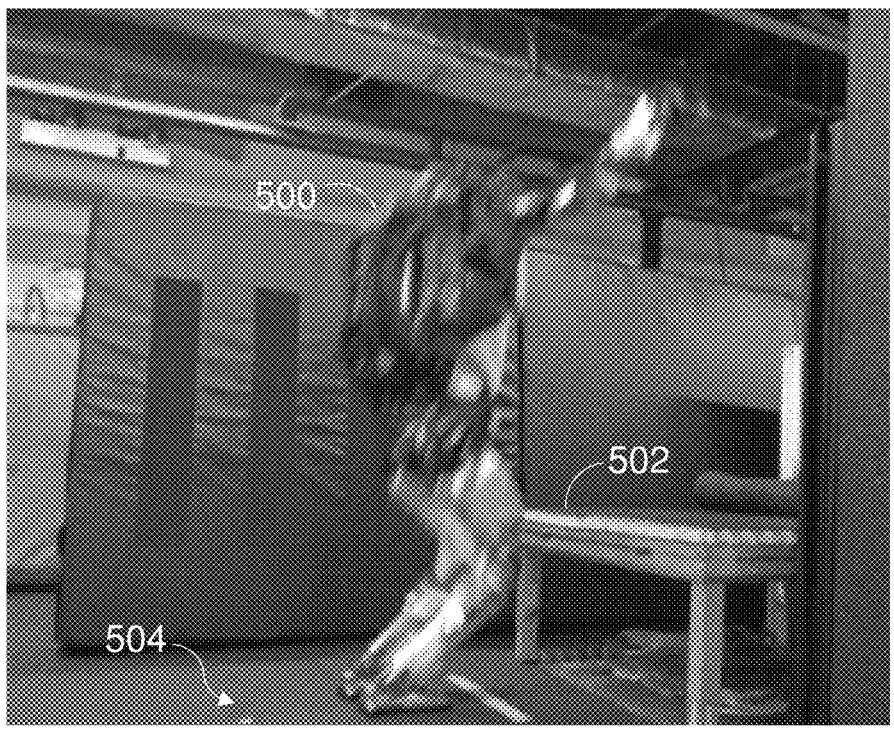
Figure 5F:
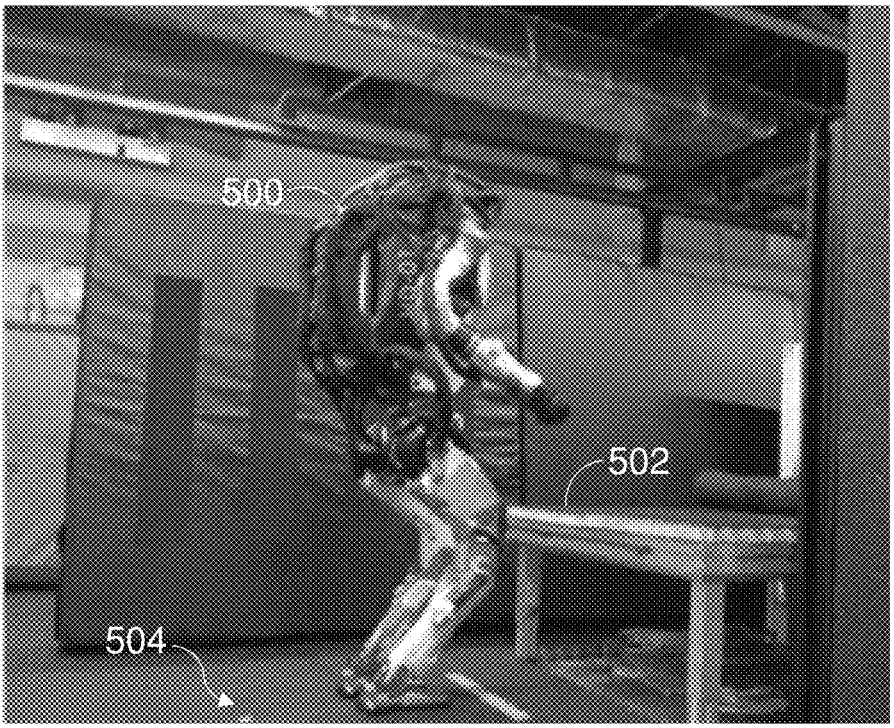

FIGS. 4A-4F are sequential schematic views of a model humanoid robot 400 executing a trajectory target based on a template behavior of jumping up onto, and down off of, a rigid box 402, according to an illustrative embodiment of the invention. In FIG. 4A, the robot 400 begins to crouch in preparation to jump up onto the rigid box 402 from the ground plane 404. In FIG. 4B, the robot 400 has taken off from the ground plane 404. In FIG. 4C, the robot 400 lands on top of the rigid box. In FIG. 4D, the robot 400 has lifted its feet off the rigid box 402. In FIG. 4E, the robot 400 has landed back on the ground plane 404 and assumes a crouching position. In FIG. 4F, the robot 400 has reassumed a standing rest position. FIGS. 4A-4F demonstrate the additional degrees of freedom exhibited by a humanoid robot having several joints, all of which can be reflected in the calculated kinematic trajectory. As FIGS. 4A-4F demonstrate, the final motion resembles a lifelike jump in which the robot's 400 arms, legs, and other features move in a coordinated fashion to shape momentum and execute a fluid motion.

FIGS. 5A-5F are sequential views of a real-world humanoid robot 500 executing a retargeted trajectory based on an adapted version of the trajectory target shown in FIGS. 4A-4F, according to an illustrative embodiment of the invention. In FIGS. 5A-5F, small differences may be apparent, such as the precise height of the landing surface 502 relative to the ground plane 504, but the illustrated motion generally resembles what is shown in the template behavior of FIGS.

4A-4F. Under these circumstances, the robot 500 would only need to make small adaptations in real time to the template behavior to execute the jump in the real world.

Figure 6A:
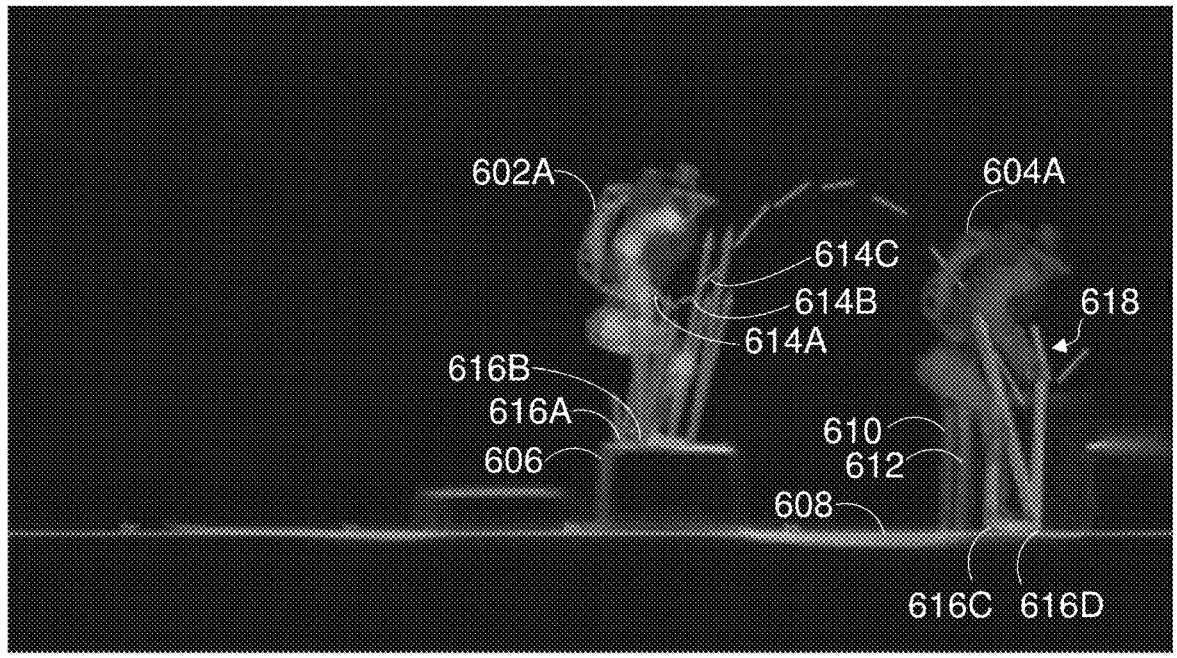
FIGS. 6A-6D are sequential illustrations of a retargeted trajectory for a humanoid robot based on an actual robot log, according to an illustrative embodiment of the invention.
Figure 6B:
Figure 6C:
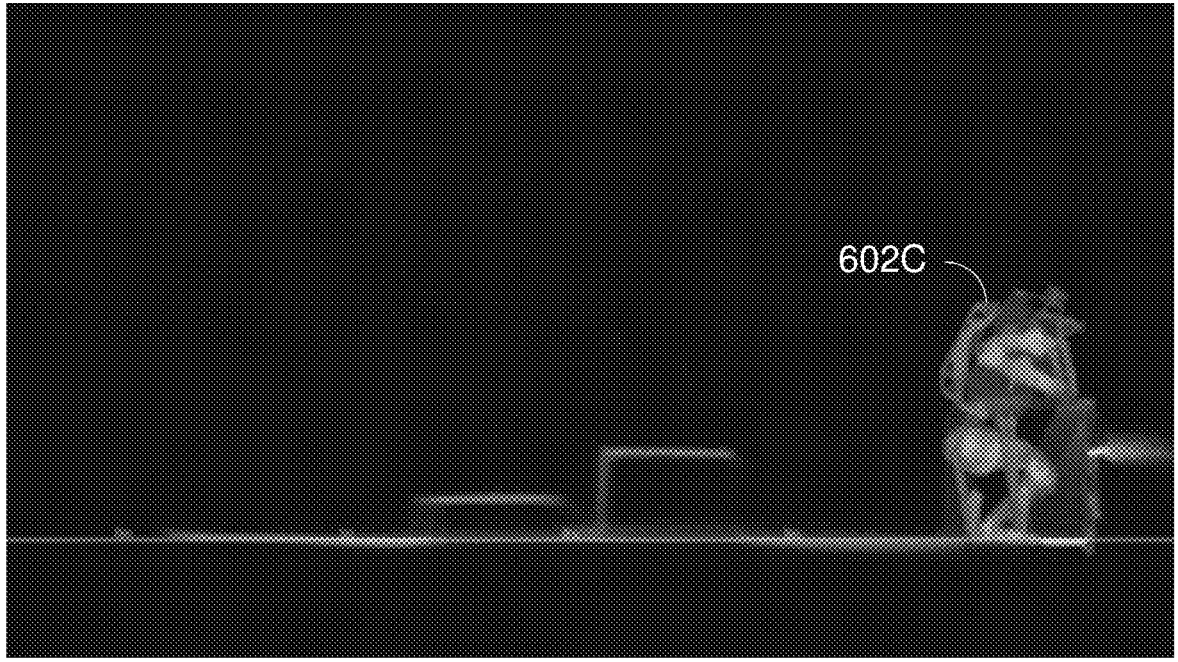
Figure 6D:
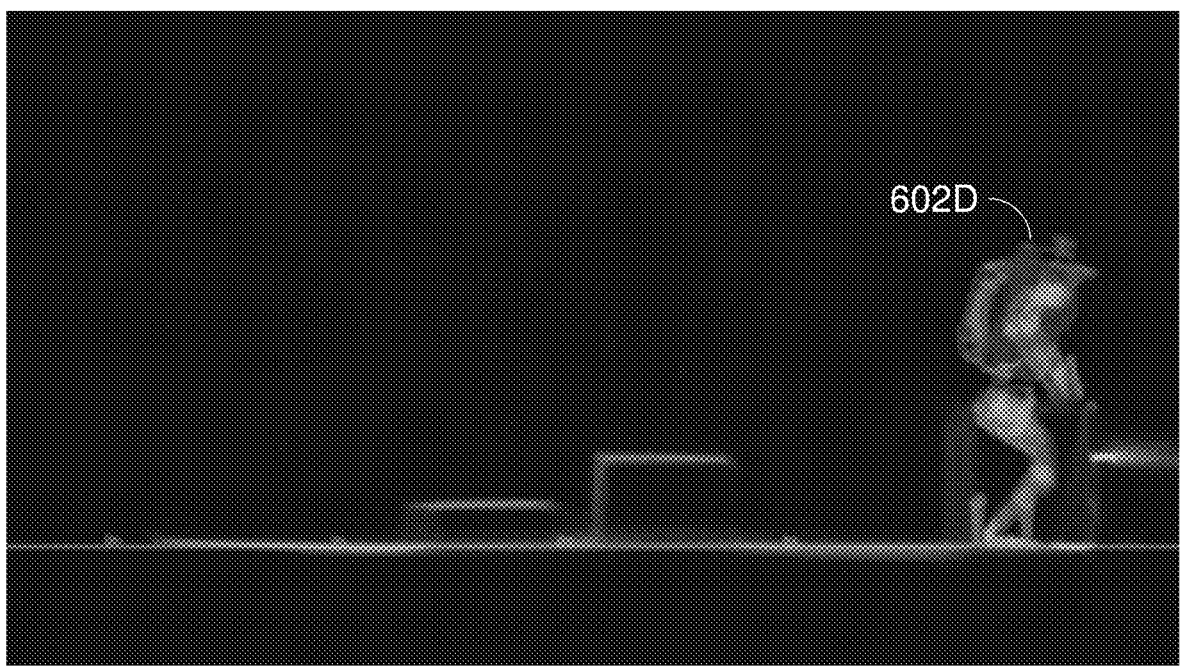

FIGS. 6A-6D are sequential illustrations of a retargeted trajectory for a humanoid robot based on an actual robot log, according to an illustrative embodiment of the invention. In FIG. 6A, an initial depiction of the robot's estimated state 602A is shown, and a kinematics module of the robot (e.g., the kinematics module 312 shown and described in FIG. 3 above) produces the expected touchdown configuration 604A at a time in the future. Over time, the estimated state evolves (e.g., it is shown as 602B in FIG. 6B, 602C in FIG. 6C, and 602D in FIG. 6D), as does the expected touchdown configuration (e.g., it is shown as 604B in FIG. 6B and is removed in FIGS. 6C-6D so as not to obscure the estimated state 602C, 602D). In this setup, the robot jumps off of a platform 606 elevated off of the ground 608 and lands between two other structures 610, 612, using its hands 618 to balance and come to rest between the structures 610, 612.

In these illustrations, a MPC of the robot (e.g., the MPC 310 shown and described in FIG. 3 above) has produced the vectors 614 (e.g., the first three labeled as 614A-C) showing an expected motion of the center of mass of the robot. The origin of each of vectors 614A-C is a predicted location of the center of mass of the robot, and the magnitude is the predicted linear momentum of the robot. The arrows 616A-B coming out of the ground are the predicted ground reaction forces (magnitude and direction) at a time in the immediate future, and the arrows 616C-D are predicted at a time further into the future. In some embodiments, these arrows 616 can be color coded on a color spectrum corresponding to a time coordinate (e.g., "more purple" can mean closer to the current point in time and "more green" can mean further into the future).

Figure 7A:
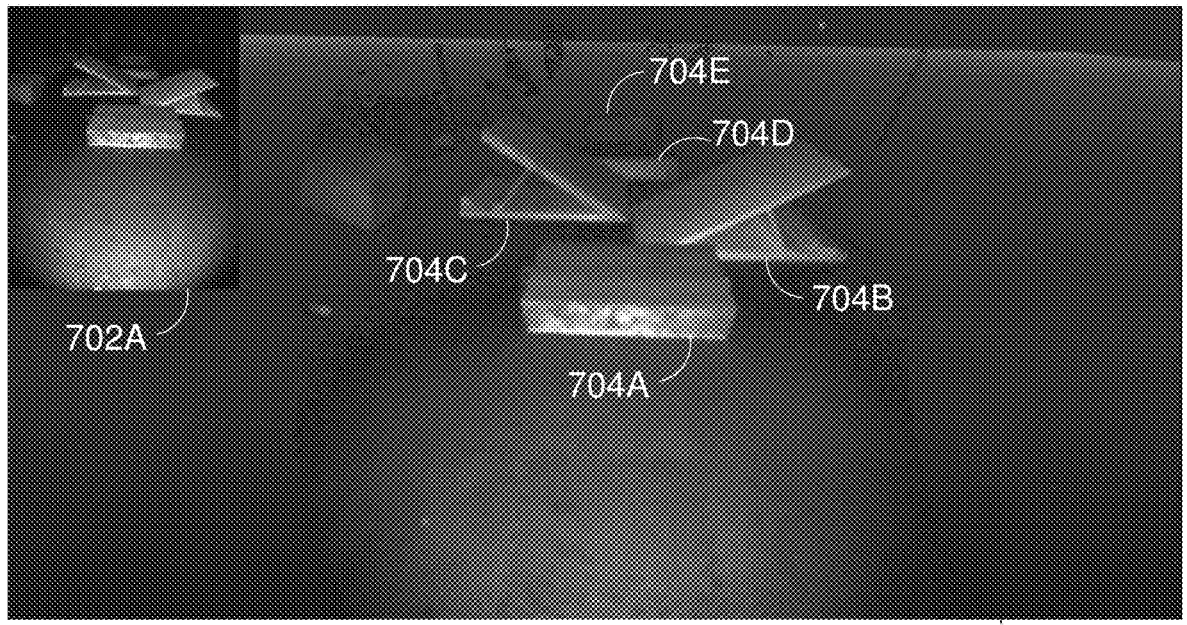
FIGS. 7A-7E are sequential views of an obstacle course as sensed by a humanoid robot traversing the obstacle course, according to an illustrative embodiment of the invention.
Figure 7B:
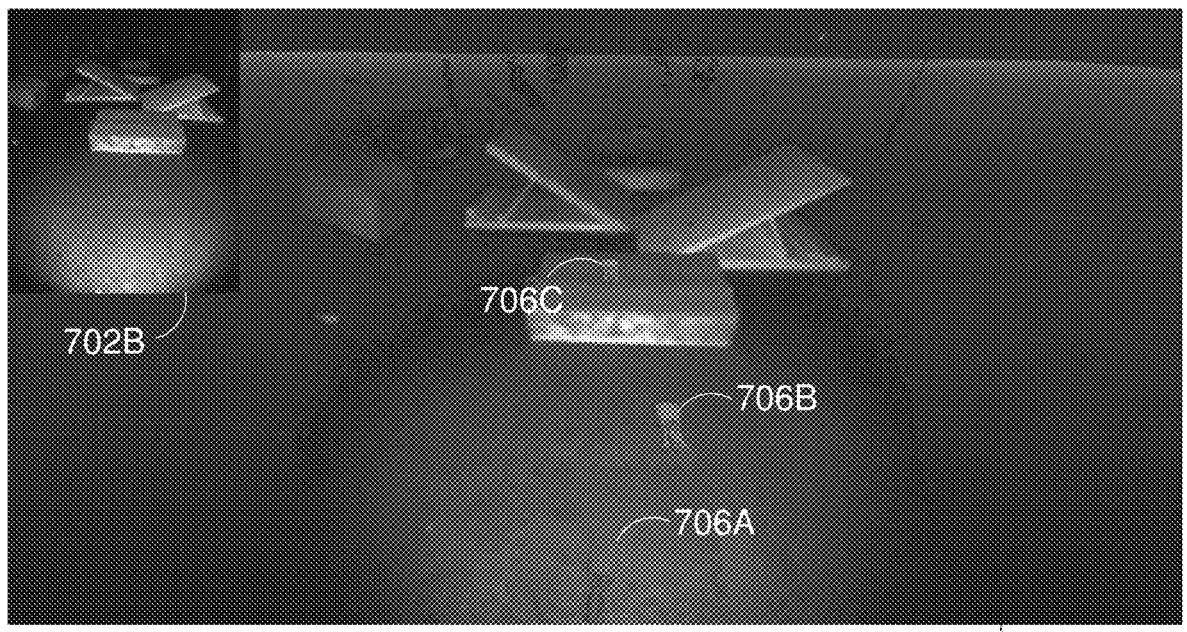
Figure 7C:
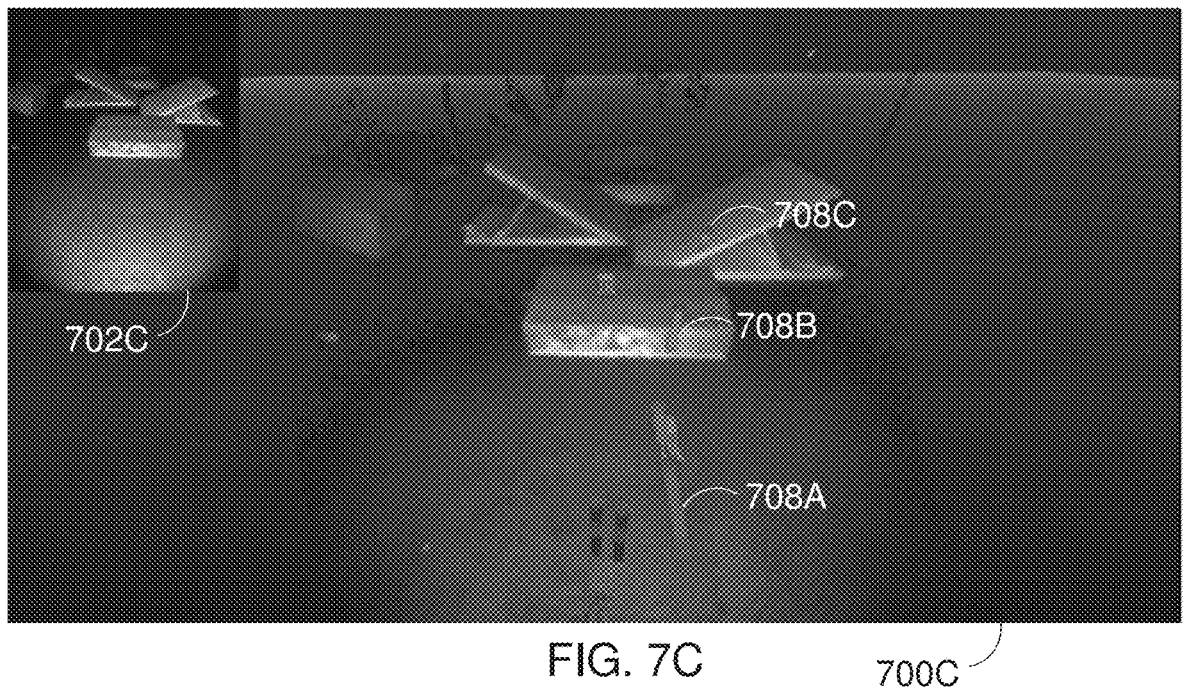
Figure 7D:
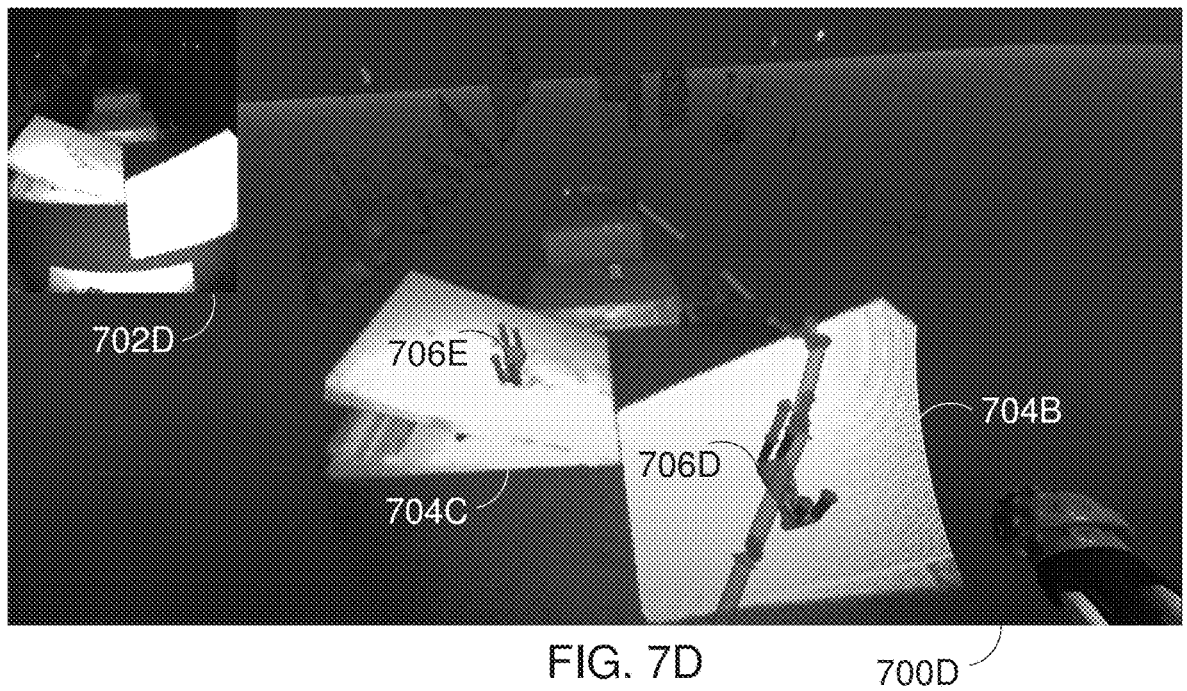
Figure 7E:
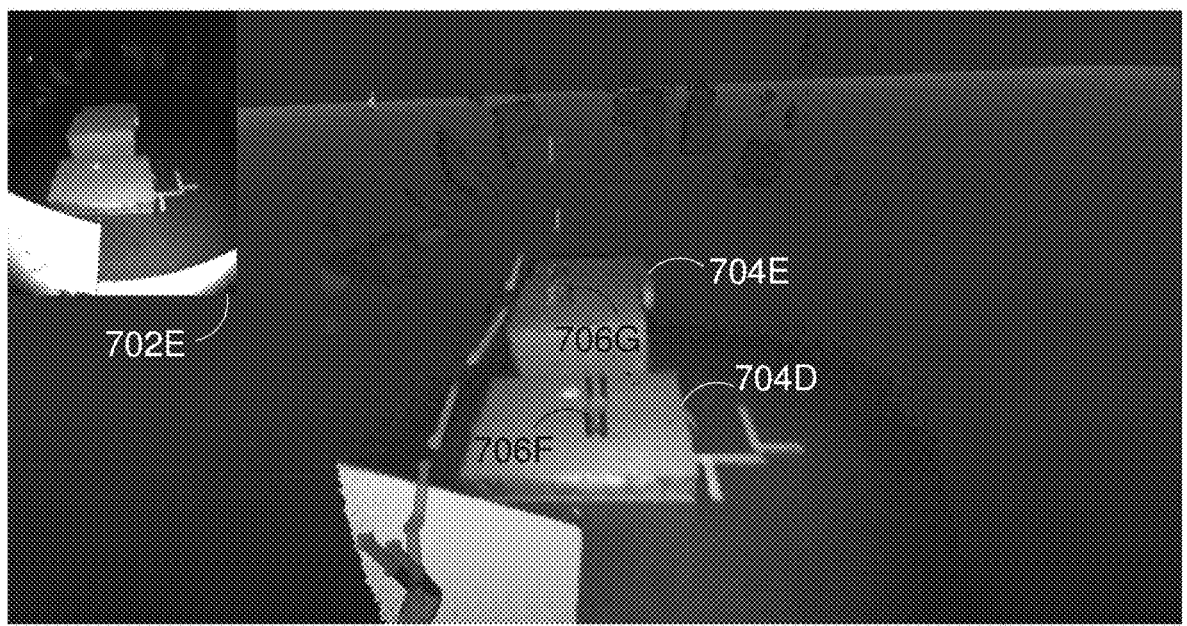

FIGS. 7A-7E are sequential views 700A-E of an obstacle course as sensed by a humanoid robot traversing the obstacle course, according to an illustrative embodiment of the invention. In FIGS. 7A-7E, thumbnail snapshots 702A-E, taken at the same time by a camera, are also visible as references in the upper left hand corner. In FIGS. 7A-7E, certain aspects of the planning of the robot are apparent in real time as it traverses the obstacle course. In FIG. 7A, a set of obstacles 704A-E is apparent and is also reflected in the thumbnail snapshot 702A. In FIG. 7B, the same set of obstacles 704A-E is visible, except the humanoid robot has now overlaid on its sensed environment, planned touchdown locations 706A, 706B, 706C for its feet. In FIG. 7C, the robot begins to move toward its planned touchdown locations, and draws vectors 708A-C over the image. These vectors correspond to a center of mass trajectory of the robot planned for the immediate future. In FIGS. 7D-7E, the robot's movement continues over the obstacles, with the center of mass momentum and touchdown contact locations and forces adjusted as needed to guide the robot through the obstacle course. As seen in FIGS. 7A-7E, the robot has concatenated multiple trajectories in a fluid form, as it steps on obstacles 704B, 704C each with one foot using planned footsteps 706D, 706E, respectively, as shown in FIG. 7D, and continues over obstacles 704D, 704E each again with only one foot using planned steps 706F, 706G, respectively, as shown in FIG. 7E.

FIG. 8 is a schematic diagram of a center-of-pressure formulation 800 for a model predictive controller of a robot, according to an illustrative embodiment of the invention. Some other formulations instead represent one or more physical contact points of the robot with the external world (e.g., representing each footstep on the ground as four contact points at the corners of the robot's rectangular feet). In such formulations, each discrete contact point is accompanied by a single three-dimensional (3D) contact force represented at the contact point (see, e.g., planned contact steps 706D, 706E, as shown above in FIG. 7D, for an example of footsteps having four discrete contact points with accompanying forces shown as protruding vectors). Each force can further be constrained to lie within a linearized friction cone and can include additional constraints on minimum and maximum normal force. Such a model can carry the advantage of simplicity and extensibility (e.g., more complex wrenches can be represented by adding more points). However, in some cases, this model can lead to inefficient parameterization, overestimation of yaw torque, and/or difficulty in representing per-link constraints. Also, in some cases complex behaviors might require more contact point trajectories than can be efficiently calculated in real time.

In the embodiment shown in FIG. 8, a center-of-pressure formulation 800 can be used instead. The center-of-pressure formulation can include a force 802, a center of pressure 804 on the surface of the corresponding link, and a torque 806 about the direction perpendicular to the surface. The vector 808 represents a displacement of the center of pressure relative to the center of the contact patch. In some embodiments, such a formulation can provide a more precise way to control the position of the center of pressure and/or separately regulate the yaw torque coefficient of friction (e.g., to avoid slipping). In some embodiments, the control module (e.g., the MPC 310 and/or the kinematics module 312 shown and described above) can solve for contact forces and motion of center of mass and/or body pose over a time horizon into the future (e.g., about one second or exceeding one second). In some embodiments, this control module can be used to implement multiple (e.g., all) behaviors in a given robot. In some embodiments, this formulation can include six variables representing the wrench on each link, e.g., a 3D force, a 2D displacement of the center of pressure relative to the center of the contact patch, and a 1D torque about that center of pressure in the direction perpendicular to the surface. In some embodiments, linear constraints ensure that the force is within a given friction cone 810, the normal force is within some specified boundaries, the center of pressure is within the contact patch, and/or that the yaw torque is within some friction limit.

In some embodiments, this center-of-pressure formulation provides distinct advantages. For example, wrenches are not over-parameterized, as only six decision variables are required for each link wrench. In addition, this formulation provides a 1:1 association between contacts and links. Under this formulation, per-link maximum forces are easy to implement; no contact merging is necessary; and leg length constraints affect only one contact, rather than many points. Moreover, the model provides explicit control over yaw friction, as the yaw coefficient of friction can be set separately from the linear coefficient, allowing more shear force to be exerted while avoiding yaw slipping.

FIG. 9 is a flowchart of an exemplary method 900, according to an illustrative embodiment of the invention. At operation 902, a computing system of a robot receives information including a navigation target for the robot and a kinematic state of the robot. At operation 904, the computing system determines, based on the information and a trajectory target for the robot, a retargeted trajectory for the robot. At operation 906, the computing system determines, based on the retargeted trajectory, a centroidal trajectory for the robot and a kinematic trajectory for the robot consistent with the centroidal trajectory. At operation 908, the computing system determines, based on the centroidal trajectory and the kinematic trajectory, a set of vectors having a vector for each of one or more joints of the robot.

A number of implementations have been described. Nevertheless, it will be understood that various modifications may be made without departing from the spirit and scope of the disclosure.

What is claimed is:

1. A computer-implemented method comprising:
receiving, by a computing system of a robot, information including a navigation target for the robot and a kinematic state of the robot;
determining, by the computing system, based on the information and a trajectory target for the robot, a retargeted trajectory for the robot, wherein the trajectory target is based on a linear motion of the robot and an angular motion of the robot, and wherein the retargeted trajectory is based on an adjusted linear motion of the robot and an adjusted angular motion of the robot;
determining, by the computing system, based on the retargeted trajectory, a whole-body kinematic trajectory for the robot; and
controlling, by the computing system, movement of the robot based on the whole-body kinematic trajectory for the robot.

2. The method of claim 1, wherein the retargeted trajectory is further based on at least one contact wrench of the robot.

3. The method of claim 1, wherein the navigation target for the robot is a first navigation target, and wherein the information further includes a second navigation target for the robot and a second kinematic state of the robot, the method further comprising:
determining, by the computing system, based on the information and a second trajectory target for the robot, a second retargeted trajectory for the robot;
determining, by the computing system, based on the second retargeted trajectory, a second whole-body kinematic trajectory for the robot; and
controlling, by the computing system, movement of the robot based on the second whole-body kinematic trajectory for the robot.

4. The method of claim 3, further comprising concatenating, by the computing system, the whole-body kinematic trajectory with the second whole-body kinematic trajectory.

5. The method of claim 1, wherein the navigation target is determined by a perception module of the robot that (i) receives measurements from at least one depth perceiving camera of the robot, and (ii) identifies, based on the measurements, at least one local planar region in an environment of the robot.

6. The method of claim 1, wherein the whole-body kinematic trajectory is consistent with at least one environmental constraint or physical constraint of the robot.

7. The method of claim 1, wherein the retargeted trajectory is determined for a time horizon of greater than one second.

8. The method of claim 1, wherein the robot is a humanoid robot.

9. The method of claim 1, further comprising:
determining, by the computing system, based on the whole-body kinematic trajectory, control information for each of one or more joints or links of the robot,
wherein controlling movement of the robot based on the whole-body kinematic trajectory for the robot comprises controlling movement of the robot based on the control information.

10. The method of claim 9, wherein the control information includes position information and/or torque information for each of one or more joints or links of the robot.

11. The method of claim 10, wherein determining control information for each of one or more joints or links of the robot comprises determining, as a function of time, a magnitude, and a direction of a force to apply to each respective joint or link.

12. The method of claim 9, wherein the control information includes, for each of one or more links of the robot, a force on the link, a displacement of a center of pressure of the link relative to a geometric center of a contact patch of the link, and a torque about the center of pressure of the link.

13. The method of claim 12, wherein the force is represented as a three-dimensional force acting on the link, the center of pressure is represented as a two-dimensional displacement relative to a center of a contact patch of the link, and the torque is represented as a one-dimensional torque in a direction perpendicular to a surface of the link.

14. The method of claim 1, further comprising determining, by the computing system, a centroidal trajectory for the robot, wherein the whole-body kinematic trajectory is consistent with the centroidal trajectory.

15. The method of claim 1, further comprising:
storing a plurality of pre-computed trajectory targets, wherein the trajectory target is selected from the plurality of pre-computed trajectory targets.

16. The method of claim 15, wherein the trajectory target is selected based, at least in part, on a task to be achieved by the robot.

17. The method of claim 15, wherein the trajectory target is selected based, at least in part, on a perception input from a perception module of the robot.

18. A computing system of a robot comprising:
data processing hardware; and
memory hardware in communication with the data processing hardware, the memory hardware storing instructions that when executed on the data processing hardware cause the data processing hardware to perform operations comprising:
determining based on information including a navigation target for the robot and a trajectory target for the robot, a retargeted trajectory for the robot, wherein the trajectory target is based on a linear motion of the robot and an angular motion of the robot, and wherein the retargeted trajectory is based on an adjusted linear motion of the robot and an adjusted angular motion of the robot;
determining based on the retargeted trajectory, a whole-body kinematic trajectory for the robot; and
controlling movement of the robot based on the whole-body kinematic trajectory for the robot.

19. The computing system of claim 18, wherein the navigation target for the robot is a first navigation target, and wherein the information further includes a second navigation target for the robot, the operations further comprising:
determining based on the information and a second trajectory target for the robot, a second retargeted trajectory for the robot;
determining based on the second retargeted trajectory, a second whole-body kinematic trajectory for the robot; and controlling movement of the robot based on the second whole-body kinematic trajectory for the robot.

20. The computing system of claim 18, the operations further comprising:

determining, by the computing system, a centroidal trajectory for the robot, wherein the whole-body kinematic trajectory is consistent with the centroidal trajectory.

* * * * *